US010215620B2

(12) United States Patent
Zadeh

(10) Patent No.: US 10,215,620 B2
(45) Date of Patent: Feb. 26, 2019

(54) Z-CASTER AND Z-CHIP DEVICES

(71) Applicant: Lotfi A. Zadeh, Berkeley, CA (US)

(72) Inventor: Lotfi A. Zadeh, Berkeley, CA (US)

(73) Assignee: BTPATENT LLC, Potomac, MD (US)

( * ) Notice: Subject to any disclaimer, the term of this patent is extended or adjusted under 35 U.S.C. 154(b) by 149 days.

(21) Appl. No.: 15/593,119

(22) Filed: May 11, 2017

(65) Prior Publication Data
US 2018/0328781 A1 Nov. 15, 2018

(51) Int. Cl.
H01H 3/14 (2006.01)
G01G 19/52 (2006.01)
G01G 3/13 (2006.01)

(52) U.S. Cl.
CPC ............ *G01G 19/52* (2013.01); *G01G 3/13* (2013.01); *H01H 3/141* (2013.01)

(58) Field of Classification Search
CPC .... G01G 3/13; G01G 19/414; G01G 23/3728; G01G 19/52; H01H 3/14; H01H 3/141; A47C 7/006; A47C 31/00; A47B 91/00
See application file for complete search history.

(56) References Cited

U.S. PATENT DOCUMENTS

| | | | | |
|---|---|---|---|---|
| 4,763,739 A * | 8/1988 | Kasinoff | ................ | G01G 3/142 177/1 |
| 4,888,581 A * | 12/1989 | Guscott | ................ | G08B 21/043 340/666 |
| 5,210,528 A * | 5/1993 | Schulman | ................ | G08B 3/10 200/86 R |
| 5,750,937 A * | 5/1998 | Johnson | ............. | G01G 23/3707 177/199 |
| 5,959,259 A * | 9/1999 | Beshears | ................ | G08G 1/015 177/132 |
| 6,603,082 B1 * | 8/2003 | Delbruck | ............. | G01G 19/414 177/132 |
| 7,547,851 B1 * | 6/2009 | Wong | ................ | G01G 19/4146 177/25.13 |
| 8,311,973 B1 | 11/2012 | Zadeh | | |

* cited by examiner

*Primary Examiner* — Randy W Gibson
(74) *Attorney, Agent, or Firm* — Bijan Tadayon; Saied Tadayon

(57) ABSTRACT

In one example, we describe a method and system for tables, beds, chairs, cabinets, bags, boxes, or appliances, to find the weight of an object or human conveniently and reliably, using Z-casters. Z-caster is based on Z-numbers, which is a pair of (A,B), where A is the value of the weight (based on and expressed as a Fuzzy parameter/value), and B is the reliability for that (expressed here as a Z-number). The calibration method is also described. Each basic unit has 2 types of sensors: for coarse measurement (just as a switch, with a rough/Fuzzy threshold) and for fine measurement. Many variations, examples, applications, and materials are shown here.

20 Claims, 16 Drawing Sheets

Tiles covering floor/area, as mat or pad

Z-CASTER AND Z-CHIP DEVICES

BACKGROUND OF THE INVENTION

Measuring weights for a patient on a hospital bed, who cannot move easily, is generally very difficult. There is no good solution which can do this task conveniently and reliably. Here, we have offered a new method and system to do this for beds and other objects, using Z-casters, as explained below. The calibration method is also needed for such a system/method. The invention and embodiments described here, below, have not been addressed or presented, in any prior art.

SUMMARY OF THE INVENTION

In one embodiment, we describe a method and system for tables, beds, chairs, cabinets, bags, boxes, or appliances, to find the weight of an object or human conveniently and reliably. Many variations, examples, and materials are shown here. Z-caster is based on Z-numbers, which is a pair of (A,B), where A is the estimated value of the weight (a Fuzzy parameter/value), and B is the reliability for that, as explained fully in U.S. Pat. No. 8,311,973. Please note that Z-numbers were previously invented by Prof. Lotfi Zadeh, of U.C. Berkeley, a world-renowned computer scientist, also known as "The Father of Fuzzy Logic", and the inventor of the current application. The calibration method is also described. Each basic unit has 2 types of sensors: for coarse measurement (just as a switch) and for fine measurement, to be more efficient, working in 2-steps.

DETAILED DESCRIPTION OF THE PREFERRED EMBODIMENTS

Figure 1:
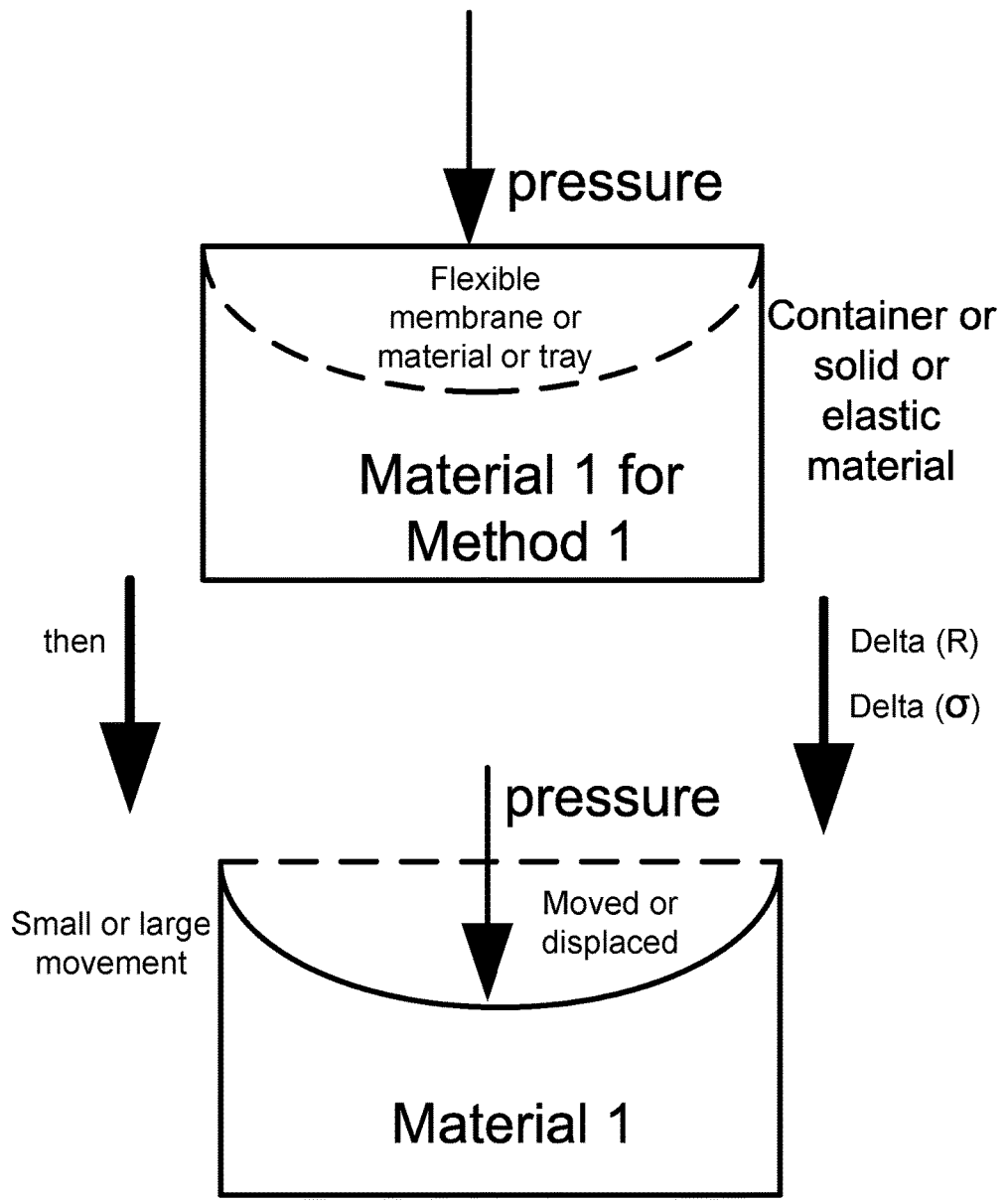
FIG. 1 is for one embodiment, as an example, for container for Method 1.

Measuring Pressure:

The value of the weight or force divided by the area or cross section produces the pressure. So, knowing the pressure and the cross section, one can find the weight or force exerted on that object or area. The cross section of the object can be measured beforehand, and thus, it is known to us. Therefore, we need to find the pressure, now.

There are 2 major methods available in the industry that we use here for detecting the pressure or change in the pressure (or deltas):

1. Measuring the pressure (P) based on the change in/as a function of the conductivity ($\sigma$) or resistivity (R, which is the inverse of electrical conductivity) of a material, which is calibrated based on the known curves, tables, or values for the materials studied by others, well known in the art, as shown below, with some examples. (e.g., R as a function of P, or (R=R(P)))
2. Measuring the pressure based on the piezoelectric effect (produced charge Q, or voltage, due to exerted pressure P), which is calibrated based on the known curves, tables, or values for the materials studied by others, well known in the art, as shown below, with some examples. (e.g., Q as a function of P, or (Q=Q(P)))

Method 1:

Let's first look at Method 1 (i.e., measuring the pressure based on the change in the conductivity or resistivity of a material), with some examples and references shown below:

1—The effect of pressure on the electrical resistivity of water-saturated crystalline rocks was studied by Brace et al. (15 Nov. 1965, J. of Geophysical Research, Volume 70, Issue 22, Pages 5669-5678):

"Electrical resistivity of eight igneous rocks and two crystalline limestones was measured at pressures to 10 kb. The rocks were saturated with tap water or salt solution, and the pore pressure was maintained near zero. The dependence of resistivity on temperature, porosity, and pore fluid salinity suggested that conduction was primarily electrolytic throughout the entire pressure range, even though the porosity of some rocks was less than 0.001. Resistivity increased with increasing pressure. The average increase over the 10-kb range amounted to a factor of 250. The changes of resistivity with pressure parallel changes of compressibility with pressure, being rapid over the first 2 kb and tapering off more gradually at higher pressures. The data suggests that the electrical conduction of these rocks consists of (1) conduction along cracks, below a few kilobars pressures, and (2) volume and surface conduction along a network of pores which persist throughout the entire pressure range. Surface conduction of the rocks saturated with tap water was 10 to 20 times greater than the volume conduction of the pores. The dependence of conductivity on porosity for all the samples saturated with saline solution followed the same empirical law that is observed for porous sedimentary rocks, $\sigma(rock)=\sigma(solution)\times\eta2$."

2—Pulse analysis and electric contact measurements in spark plasma sintering was studied by Charles Maniere et al. (Electric Power Systems Research 127, October 2015), with the result that the electrical contact resistance goes down at the higher temperatures.

3—Influence of pressure and temperature on the electrical conductivity of dolomite was studied by Shigeaki Ono et al. (Physics and Chemistry of Minerals, October 2015, Volume 42, Issue 9, pp 773-779):

"The electrical conductivity of dolomite, (Mg, Ca) CO3, was investigated under conditions of 650-1000 K and 3-6 GPa with a multi-anvil press and an impedance spectroscopy analyzer with a frequency range of 0.05-106 Hz. As pressure increased, an increase in the electrical conductivity and a decrease in the calculated activation enthalpy were observed. The negative activation volume observed in this study suggests that the hopping of polarons is the dominant mechanism for the electrical conductivity across the pressure and temperature range investigated. This mechanism is the same as that of magnesite, MgCO3, which has the similar structure of dolomite. In contrast, the mechanism of the ionic conduction was reported in aragonite, CaCO3. These results indicate that the mechanism for the electrical conductivity of carbonate minerals varies because of a crystallographic difference between the calcite- and the aragonite-type structure."

4—The electrical resistance of ytterbium as a function of temperature and pressure was studied by Lilley et al. (Univ. of Calif., Livermore, Report Number UCRL-51006):

"We have measured the piezoresistance of ytterbium from three sources at pressures up to 40 kbar and at temperatures between 21 and 90° C. under hydrostatic and quasi-hydrostatic conditions. From our data, from calculations of Hugoniot state temperatures, and from the geometrical effect of plane strain on resistance, we also calculated the piezoresistance of ytterbium along the Hugoniot. Our computed results agree with the experimental Hugoniot data of Brown for the same samples to within 10%."

5—Pressure dependence of electrical conductivity of metals at low temperatures was studied by Goree et al. (Journal of Physics and Chemistry of Solids, Volume 27, Issue 5, May 1966, Pages 835-848):

"Using a large high pressure helium gas facility, the electrical resistance of high purity wires of Au, Ag, In, and Sn has been measured as a function of hydrostatic pressure up to 6 kb at selected temperatures between 4.2° K and 297° K."

6—The effect of pressure on the electrical conductivity of solutions of sodium chloride and of other electrolytes was studied by Adams et al. (J. Phys. Chem., 1931, 35 (8), pp 2145-2163).

7—Pressure dependence of electrical conductivity of (Mg,Fe) SiO3 ilmenite was studied by Katsura et al. (Physics and Chemistry of Minerals, May 2007, Volume 34, Issue 4, pp 249-255):

"The electrical conductivity of $(Mg_{0.93}Fe_{0.07})$ SiO$_3$ ilmenite was measured at temperatures of 500-1,200 K and pressures of 25-35 GPa in a Kawai-type multi-anvil apparatus equipped with sintered diamond anvils. In order to verify the reliability of this study, the electrical conductivity of $(Mg_{0.93}Fe_{0.07})$ SiO$_3$ perovskite was also measured at temperatures of 500-1,400 K and pressures of 30-35 GPa. The pressure calibration was carried out using in situ X-ray diffraction of MgO as pressure marker. The oxidation conditions of the samples were controlled by the Fe disk. The activation energy at zero pressure and activation volume for ilmenite are 0.82(6) eV and −1.5(2) cm$^3$/mol, respectively. Those for perovskite were 0.5(1) eV and −0.4(4) cm$^3$/mol, respectively, which are in agreement with the experimental results reported previously. It is concluded that ilmenite conductivity has a large pressure dependence in the investigated P-T range."

8—The pressure effect on the electrical conductivity of peridot was studied by Hughes (J. of Geophysical Research, Volume 60, Issue 2, June 1955, Pages 187-191), where "the effect of pressure on the ionic conductivity of peridot is measured, and its influence on the electrical conductivity and temperature of the earth's mantle is discussed."

9—The effect of pressure on the electrical conductivity of sea water was studied by Home et al. (J. of Geophysical Research, Volume 68, Issue 7, 1 Apr. 1963, Pages 1967-1973):

"The specific electrical conductance of 9.68, 17.61, and 19.376 per mil chlorinity sea water has been measured at 0°, 5°, 15°, and 25° C. over the pressure range 1 to 1380 bars. Over the pressure range 1 to 689 bars, the specific conductance Kp at pressure P can be estimated from the value at 1 atmosphere, K1, using the simple empirical relation, $KP=K1+(0.35\pm0.25\pm0.18\pm0.028Cl)\times10^{-6}P$, where Cl is the per mil chlorinity."

10—The effect of pressure on the electrical conductivity of InSb, a III-V compound semiconductor material, used in electronic devices/transistors, was studied by Keyes (Phys. Rev. 99, 490, 15 Jul. 1955):

"The electrical conductivity of InSb has been measured as a function of temperature from −78° C. to +300° C., and pressures up to 12 000 kg/cm2. It is found that the activation energy increases at a rate $15.5\times10^{-6}$ ev/(kg/cm2), that the electron mobility is approximately inversely proportional to the activation energy, and that the hole mobility is independent of pressure. On the basis of these mobility effects, it is concluded that the k of the valence band energy extremum is not zero. An examination of the effects of pressure and temperature above 200° C. suggests that there are three or four equivalent energy minima in the conduction band."

11—The increase of electrical conductivity with pressure as an indicator of conduction through a solid phase in midcrustal rocks was studied by Shankland et al. (Journal of Geophysical Research, Vol. 102, No. B7, Pages 14,741-14, 750, Jul. 10, 1997):

"Rocks freshly cored from depth at the German continental scientific drilling site (KTB) offer an opportunity to study transport properties in relatively unaltered samples resembling material in situ. Electrical conductivity σ was measured to 250 MPa pressure, and room temperature on 1 M NaCl-saturated amphibolites from 4 to 5 km depth. An unexpected feature was an increase of a with pressure P that appeared (anisotropically) in most samples. To characterize this behavior, we fitted the linear portion of logo versus P to obtain two parameters: the slope d log σ/dP (of order $10^{-3}$ $MPa^{-1}$) and the zero-pressure intercept."

12—The effect of pressure on the electrical conductivity of liquid iodine, iodine chloride, iodine bromide, and bromine trifluoride was studied by Cleaver et al. (J. Chem. Soc., Faraday Trans. 1, 1989, 85, 2453-2464):

"The electrical conductivities of the pure liquids iodine, iodine chloride, iodine bromide and bromine trifluoride have been measured at temperatures up to 177° C. and pressures to 100 MPa (1 kbar). In all cases, the conductivity increased with pressure at constant temperature. At constant density, the conductivity always increased with temperature, but the behavior at constant pressure was more complex; ICl and IBr showed conductivity maxima, and the other liquids had negative temperature coefficients of conductivity. These variations are attributed mainly to corresponding displacements in self-ionisation equilibria of the type AB<---->$A^+$+$B^-$ (where the ions produced may be solvated by the molecular substance). Attempts to account for the measured pressure coefficients using a model based on the Born equation for the free energy of solvation were only qualitatively successful. Better agreement could be obtained if it was assumed that the charges in these liquids are delocalised over a volume containing ca. 100 molecules, as has previously been suggested by Ludwig et al. It is also likely that a part of the increase in conductivity with pressure observed for liquid iodine is due to an increase in the mobility of $I^-$ with pressure."

13—The effect of pressure on electrical conductivity of doped Poly p-Phenylene Sulfide was studied by Kawano et al. (Japanese Journal of Applied Physics, Volume 23, Part 1, Number 8):

"The electrical conduction mechanism in poly (p-phenylene sulfide) (PPS) doped with iodine ($I_2$) and tetracyanoethylene (TCNE) was investigated. X-ray diffraction and fluorescence X-ray experiments revealed that the doped TCNE and $I_2$ exist mainly in an amorphous region and the desorption of doped $I_2$ becomes very active with increasing temperature. The effect of pressure on the electrical conductivity was measured to determine the conduction mechanism in doped PPS, showing that electronic conduction takes place in TCNE-doped PPS . . . . In heat-treated $I_2$-doped PPS, it was observed that electronic conduction also contributes to the conductivity at higher pressures. Furthermore, an additional increase in the conductivity was observed in TCNE and $I_2$ double-doped PPS."

14—The pressure-dependent electrical conductivity of freestanding three-dimensional carbon nanotube network was studied by Camilli et al. (Appl. Phys. Lett. 102, 183117 (2013)):

"The dependence of electrical conductivity on compression of a freestanding three-dimensional carbon nanotube (CNT) network is investigated. This macrostructure is made of mm-long and entangled CNTs, forming a random skeleton with open pores. The conductivity linearly increases with the applied compression. This behaviour is due to increase of percolating pathways—contacts among neighbouring CNTs—under loads that is highlighted by in situ scanning electron microscopy analysis. The network sustains compressions up to 75% and elastically recovers its morphology and conductivity during the release period. The repeatability coupled with the high mechanical properties makes the CNT network interesting for pressure-sensing applications."

15—The effect of pressure on the thermal conductivity of metals was studied by Bridgman (Proceedings of the American Academy of Arts and Sciences, Vol. 57, No. 5 (April, 1922), pp. 77-127), covering metals such as Copper, Silver, Lead, Bismuth, and Tin.

16—High pressure electrical conductivity measurements in copper oxide was studied by Bourne et al. (Physical Review B, Vol. 40, No. 16, 1 Dec. 1989).

17—Simultaneous enhancement of electrical conductivity and thermopower in Bi2S3 under hydrostatic pressure was studied by Pandey et al. (J. of Materials Chemistry C, Issue 10, 2016):

"The inverse coupled dependence of electrical conductivity and thermopower on carrier concentration presents a big challenge in achieving a high figure of merit. However, the simultaneous enhancement of electrical conductivity and thermopower can be realized in practice by carefully engineering the electronic band structure. Here by taking the example of Bi2S3, we report a simultaneous increase in both electrical conductivity and thermopower under hydrostatic pressure. Application of hydrostatic pressure enables tuning of electronic structure in such a way that the conductivity effective mass decreases and the density of states effective mass increases. This dependence of effective masses leads to simultaneous enhancement in electrical conductivity and thermopower under n-type doping leading to a huge improvement in the power factor. Also lattice thermal conductivity exhibits very weak pressure dependence in the low pressure range. The large power factor together with low lattice thermal conductivity results in a high ZT value of 1.1 under n-type doping, which is nearly two times higher than the previously reported value. Hence, this pressure-tuned behaviour can enable the development of efficient thermoelectric devices in the moderate to high temperature range. We further demonstrate that similar enhancement can be observed by generating chemical pressure by doping Bi2S3 with smaller iso-electronic elements such as Sb at Bi sites, which can be achieved experimentally."

18—Electrical conductivity measurement of granulite under mid to lower crustal pressure-temperature conditions was studied by Fuji-ta et al. (Geophys J Int (2004) 157 (1): 79-86):

"We have developed a technique to measure electrical conductivity of crustal rocks with relatively low conductivity and complicated mineral components in order to compare with results given by magneto-telluric (MT) measurements. A granulite from Hidaka metamorphic belt (HMB) in Hokkaido, Japan at high temperature and pressure conditions was obtained. The granulite sample was ground and sintered under the conditions similar to those of mid to lower crust. We have observed smooth and reversible change of conductivity with temperature up to about 900 K at 1 GPa. The results were consistent with the electrical conductivity structures suggested by the MT data analysis. Considering pore fluid conduction mechanism or the role of accessory minerals in the rock, the mechanisms of electrical conductivity paths in dry or basic rocks should be reconsidered."

19—Electrical conductivity of manganin and iron at high pressures was studied by Fuller et al. (Nature 193, 262-263 (20 Jan. 1962)):

"The properties of materials at high pressures can be measured either in static compression apparatus or dynamically, using explosively induced shocks. Pressure measurement is indirect for static methods, but a reliable figure for temperature can usually be obtained. With dynamic methods, however, absolute pressures can be found from velocity measurements, but at the moment there are no known methods for the accurate determination of temperature. Resistance is probably the simplest measurement to make in static presses at high pressures, and it was thought that a useful contribution might be the extension of this measurement by dynamic methods."

20—For the high pressure liquid silica, electrical conductivity and structure, were studied by Stixrude et al. (American Geophysical Union, Fall Meeting 2014, abstract #MR33A-4338):

"The transport properties of silicate liquids are important for understanding the thermal evolution of giant impact targets, magma oceans, and the possibility of silicate dynamos in the early Earth and in other rocky planets. However, little is known about the electrical conductivity of silicate liquids over the relevant pressure-temperature regime. Here, we focus on silica as one of the most abundant components and a model system for understanding transport properties in silicates. We perform first principles molecular dynamics simulations over the pressure-temperature encompassing that of the early Earth, and compute the electrical conductivity via the Green-Kubo formula. The electrical conductivity of the liquid substantially exceeds that of crystalline phases at all conditions. We find that along isotherms the conductivity of silica liquid reaches a maximum near 40 percent compression, remarkably similar to the compression at which 5-fold Si—O coordination is most abundant. The conductivity decreases upon further compression. The conductivity increases rapidly with increasing temperature at all pressures. We explore the underlying physical mechanisms of the computed variations of conductivity with pressure and temperature and discuss the implications of our results for magnetic field generation in basal magma oceans."

21—Pressure dependence of electrical conductivity of graphite was studied by Noto et al. (J. Phys. Soc. Jpn. 35, pp. 1649-1653 (1973)):

"Electrical conductivity (a) of pyrolytic graphite along the basal was measured at room temperature in the presence of hydrostatic pressures (p) up to 20 kb. The pressure dependence coefficient d ln σ/d p evaluated was only order of $10^{-3}$/kb, despite compressive stresses gave rise to a suppression of lattice vibrations, and also to an increase of the carrier concentration (N) with a rate of d ln N/dp$>=10^{-2}$/kb. Such a discrepancy has successfully been removed by taking into account the pressure-induced change of the effective mass of carriers, which functions so as to cancel the increment of σ due to the increase of N. Calculations were performed on the basis of an effective mass approximation for the Slonczewski-Weiss band model. Thus, the participation of carrier-carrier scattering proposed by Yeoman and Young is excluded from responsible mechanisms. Discussions given of the c-axis conductivity on the same basis have also yielded a success in accounting for the pressure dependence."

Method 2:

Now, let's look at Method 2 (i.e., measuring the pressure based on the piezoelectric effect), with some examples and references shown below:

1—A piezoelectric sensor is a device that uses the piezoelectric effect, to measure changes in pressure, by converting them to an electrical charge, which causes electric current or voltage in the circuit. For example, the produced voltage is proportional to the pressure applied. For example, a thin membrane transfers the force to the object underneath.

According to Wikipedia.org (or other references):

"There are two main groups of materials used for piezoelectric sensors: piezoelectric ceramics and single crystal materials. The ceramic materials (such as PZT ceramic) have a piezoelectric constant/sensitivity that is roughly two orders of magnitude higher than those of the natural single crystal materials and can be produced by inexpensive sintering processes. The piezoeffect in piezoceramics is "trained", so their high sensitivity degrades over time. This degradation is highly correlated with increased temperature. The less-sensitive, natural, single-crystal materials (e.g., gallium phosphate, quartz, or tourmaline) have a higher (when carefully handled, almost unlimited) long term stability. There are also new single-crystal materials commercially available, such as Lead Magnesium Niobate-Lead Titanate (PMN-PT), which offer improved sensitivity over PZT, but have a lower maximum operating temperature (and are currently more expensive to manufacture)."

2—According to Wikipedia.org (or other references), some examples of the piezoelectric materials are:

Aluminum nitride
Apatite
Barium titanate
Bimorph
Bismuth titanate
Gallium phosphate
Lanthanum gallium silicate
Lead scandium tantalate
Lead zirconate titanate
Lithium tantalate
Polyvinylidene fluoride
Potassium sodium tartrate
Quartz
Sodium bismuth titanate
Unimorph Of course, here, we just mentioned a few examples that can satisfy the materials needed for Method 1 or Method 2 (shown above), for the sake of brevity and clarity, but there are much more materials out in public domain that can satisfy the materials needed for Method 1 or Method 2. So, any of those materials shown above or in the literature can be used as an example to satisfy the materials needed for Method 1 or Method 2 (i.e., measuring the pressure based on the change in the conductivity or resistivity of a material, or measuring the pressure based on the piezoelectric effect, shown above), accordingly. That is, the examples above are just examples, and they are not limiting at all for the teachings here.

Weight Measurement:

For any bed or table or chair or cabinet or showcase, one may use a caster or wheel or glider or smooth plastic plate or wide thin rug or sliding plate or plates, to move them around easier. It would be useful to put a sensor or sensors under the legs to measure the weight or partial weight for all or some legs. This is good/useful, e.g., for medical reasons (e.g., for feedback and automatic recording, for the doctor/patient to see or monitor), or for exercise schedule adjustments (e.g., for sports training for coaches or individuals), or for security reasons (e.g., to identify the people or confirm existence of people in a room or area or chair, or to monitor movement of people in a room or area).

So, we can put these sensors under the leg or under a caster or wheel, or on top of them, or in the middle of the leg connecting the 2 halves of a leg, for all or some of the legs or supports or columns. So, there are many choices for the location of the sensor(s).

We can measure the pressure using these sensor(s). We use one of the methods/devices described above for Method 1 or Method 2 to measure the pressure on each sensor. Since we already know the cross section of each sensor, we know the force or weight on each sensor. Then, each weight or partial weight can be accumulated or added (e.g., to get the total weight) at or sent to a processor or server or central computer or controller or microprocessor or central brain or calculator or CPU or mobile device or laptop. Then, the total weight is calculated from the addition of all partial weights.

Z-Caster:

The value obtained of each sensor has some reliability associated with it. The pair of sensor value (weight) plus sensor reliability (reliability parameter) can be expressed as a Z-number. For that reason, for the sensor described above, we call/name it as a "Z-caster". So, it can be expressed as a Z-number, which is a pair of (A,B), where A is the estimated value of the weight (expressed as a Fuzzy Logic value/parameter), and B is the reliability for that.

Z-Number:

Z-numbers were first introduced and invented by the inventor of this/current application, filed and patented before, as U.S. Pat. No. 8,311,973 (Ser. No. 13/423,758, filed on Mar. 12, 2019, and issued on Nov. 13, 2012, with the priority date of Sep. 24, 2011, from the provisional case Ser. No. 61/538,824), which was also published in a journal paper, by Prof. Lotfi Zadeh, called "A Note on Z-Numbers", Information Sciences 181 (2011) 2923-2932.

By the way, the inventor of the current application is Prof. Lotfi Zadeh, of UC Berkeley, a world-renowned computer scientist, who invented Fuzzy Logic many years ago, among many other theories and inventions. More details/teachings/descriptions about the Z-numbers can be obtained from that patent or many literature/books/papers published after that, e.g., those referenced in that patent or continuation of that patent, as well as the paper cited above and all referencing that paper and that patent.

Figure 3:
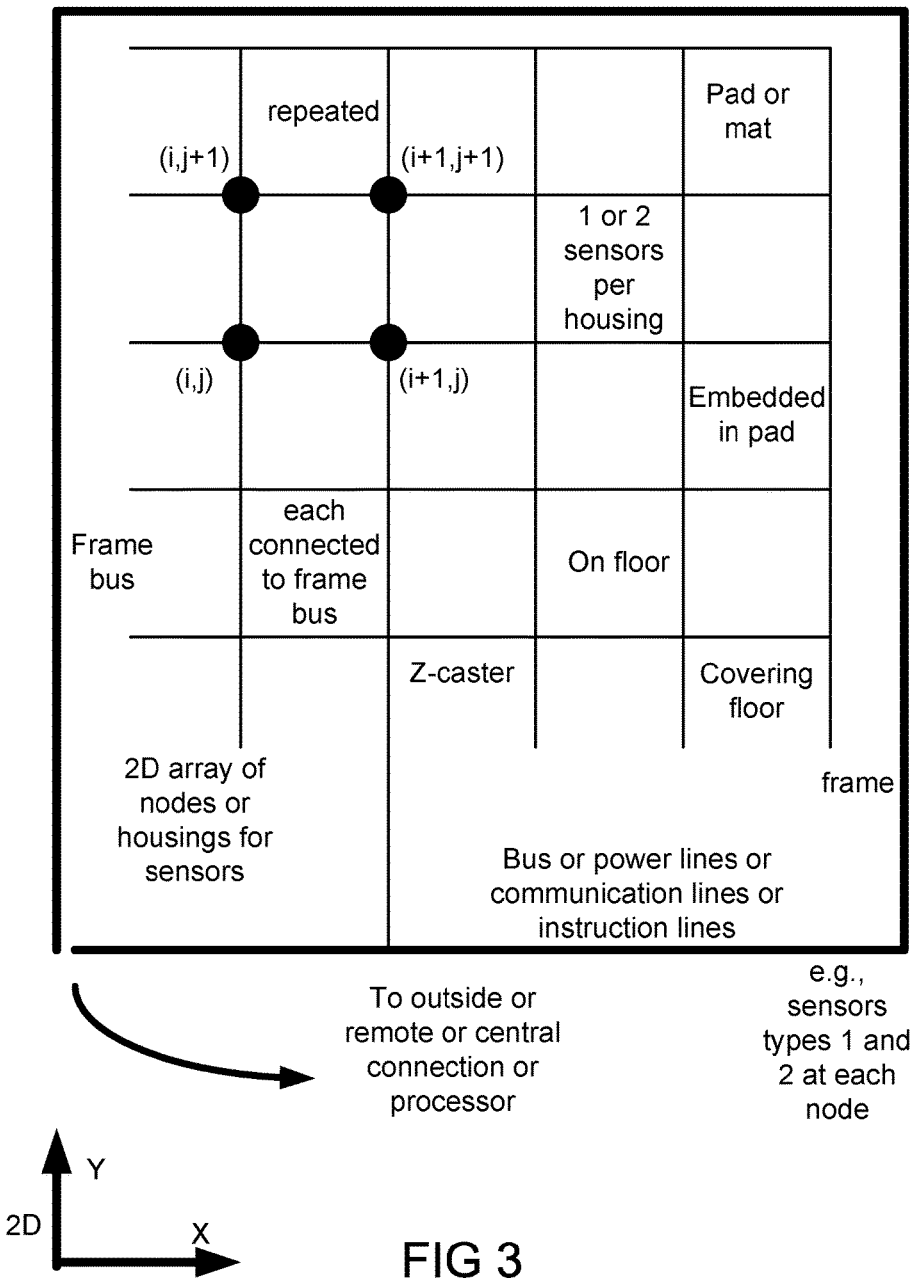
FIG. 3 is for one embodiment, as an example, for 2D array of sensors/Z-casters on the floor.

Applications:

In one embodiment, one can distribute the Z-casters as localized sensors on the floor or on a mat or carpet, in a pattern or on a matrix or 2D array, covering the area or floor, as shown in FIG. 3. Each sensor unit in this case sends the received data to the central computer for analysis or aggregation or transmission or decision (see FIG. 4). (The sensor with the corresponding circuitry, integrated on a substrate, we call it "Z-chip".) The size of each unit can be e.g. 2 mm×3 mm cross section, or in the range of 1 mm to 30 cm in its 3 dimensions, as an example. In one embodiment, we have sheets or large plates of Z-casters in 2D array form. These can cover the whole area or floor.

In one embodiment, this is extended to tracking applications, for example, to track the movement/direction/vector of movement/deltas of one or more objects, animals, persons, etc., over the pad or mat or floor, for example, by accessing an individual chip (or a group of them) from the periphery. The weight estimate would be calibrated and zero point would be baselined dynamically and repeatedly (see FIGS. 4, 9). This has a security application for a specific area of a building.

In one embodiment, this is used as weight measuring tool in applications that require form flexibility, for example, measuring the weight of a patient on the bed at home or hospital. It can be for a table (see FIGS. 5, 12), chair, cabinet, bag, box, appliance, or the like, as well.

In one embodiment, the tiles or plates are connected together to produce a larger coverage of Z-casters. In one embodiment, this is modularized, so that they have electrical connections for each tile to the next, to be expandable, to cover more areas, by putting more tiles next to the former/old one. They can be interlocked together, like a Lego brick or unit, with notches or extensions or indentations or cuts or slits or gaps, fitting with male/female parts on the other side/unit/brick/tile/Z-caster, to make them stable and fixed on the floor/ground (see FIGS. 6, 10, 11).

In one embodiment, the legs of the bed are on multiple units, each connected to a central computer. In one embodiment, all legs of the bed are a single integrated unit or expanded unit/mat/plate/tile system. The brain or the processor can be remote or on the same pad or unit, connecting/communicating wirelessly, by antenna, WiFi, Bluetooth, optical communication, laser based, cable, fiber optics, wired, copper based, or the like, with each other and to/from a central place/processor (see FIGS. 3-4). The units can be under a large tray or embedded inside a tray or on a tray, with tray being solid or foldable or rollable-rug-shaped, using plastic, metal, elastic, rubber, chain pieces, tiles, bricks, jig-saw puzzle shape piece connections/extensions/female/male parts, or the like, to connect or assemble together.

The electrical interconnects can have hinges to make them foldable or rollable-rug-shaped, with metal hinges, to connect the two sides electrically, for each tile or brick. The power source can be local or remote battery, or regular wired electricity to the unit, or solar or wind powered, locally or remotely, or rechargeable battery, or remote charging without contacts, or by electromagnetic waves or energy, or through tile connections in the big tray (see FIGS. 3, 4).

From the changes in pressure in neighboring Z-casters, one can estimate the direction of the movement of the object, and guess which object is moving. The finer and smaller these tiles/Z-casters, the better for this estimation/quantization of the coordinates in 2D space of the room. The velocity and vector can be measured for the object movement in the room, which has security applications for an area or room, to track objects' or people's movements.

For example, let's assume the coordinates of one Z-caster in 2D space coordinate of the room (see FIGS. 3, 8, 11) as (x1, y1), and the second one at location (x2,y2), measured from the coordinate origin (0,0) from the edge of the room. Let's assume that the person is on top of the first Z-caster at time t1, at coordinate (x1, y1), measured/detected by the increase on the pressure detected at that point by the first Z-caster, among the Z-casters on/in the room-wide tray on the floor, with all the Z-casters as the tiles across the floor. Let's assume that the person is on top of the second Z-caster at time t2, at coordinate (x2, y2). Then, the vector V (a 2D vector, in 2D coordinates) shows the direction of the movement or velocity vector, and S is the speed of the movement of the object or the person, as shown here:

$$V=((x2-x1),(y2-y1))$$

$$S=[\text{distance/time period}]=[((x2-x1)^2+(y2-y1)^2)^{0.5}]/(t2-t1)$$

The vectors/parameters V and S are also time dependent, and one can follow the object versus time, for status and direction and position of the object.

Figure 2:
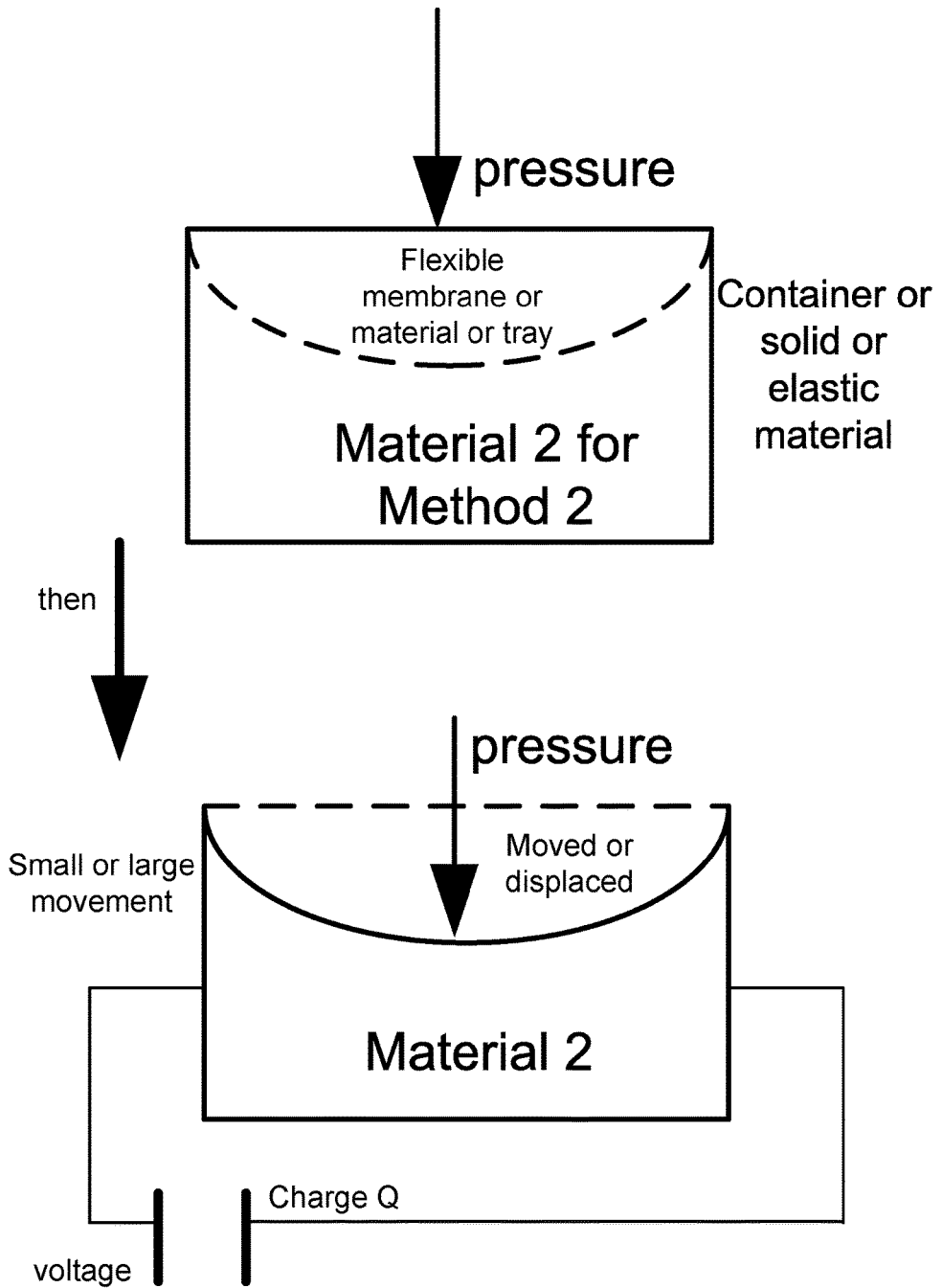
FIG. 2 is for one embodiment, as an example, for container for Method 2.

Container/Housing:

In one embodiment, each unit has a sensor, based on Method 1 or 2 explained above, which is in a container, with the material inside the container suitable for the corresponding Method 1 or 2 explained above. The container is shown in FIG. 1 for Method 1, as an example. The container is shown in FIG. 2 for Method 2, as an example. The material in the container can be liquid, gas, powder, fluid, solid, mixture, compound, metal, alloy, or the like, as shown/listed for materials for Method 1 or 2 explained above, to be able to measure the pressure or calibrate against the change in pressure, from calibration curves or tables or formulas or experimental relations, as explained in the references mentioned above or similar references, for Method 1 or 2, or as is very well-known in the literature.

For example, if for Method 1, we have the measurement of the pressure P based on the change (or delta or difference) in the resistivity R of the material in the container, we will have: (where indices 1 indicate the initial conditions/state/status/parameters, or base line, or calibration state) (see FIGS. 4, 1-2, 9)

$$\text{Delta}(P)=P2-P1$$

$$\text{Delta}(R)=R2-R1$$

Assuming linear relationship, locally, to the first order, as an example:

$$\text{Delta}(P)=K\cdot\text{Delta}(R), \text{ as the prior calibration data point.}$$

Then, if one measures R3, then we will have, to the first order:

$$[(R3-R1)/\text{Delta}(R)]=[(P3-P1)/\text{Delta}(P)]$$

Or (to find the pressure, P3):

$$P3=P1+(\text{Delta}(P)[(R3-R1)/\text{Delta}(R)])$$

Now, similarly, for example, for Method 2, we have measurement of the pressure based on the piezoelectric effect, to measure changes in pressure, by measuring electrical charge Q (or voltage G). Assuming linear relationship, locally, to the first order, as an example: (see FIGS. 4, 1-2, 9)

$$\text{Delta}(P)=P2-P1$$

$$\text{Delta}(Q)=Q2-Q1$$

$$\text{Delta}(P)=K1\cdot\text{Delta}(Q), \text{ as the prior calibration data point.}$$

Then, if one measures Q3, then we will have, to the first order:

$$[(Q3-Q1)/\text{Delta}(Q)]=[(P3-P1)/\text{Delta}(P)]$$

Or (to find the pressure, P3):

$$P3=P1+(\text{Delta}(P)[(Q3-Q1)/\text{Delta}(Q)])$$

Thus, the pressure can be obtained using interpolation, extrapolation, ratio, approximation, first order estimate, using tables, curves, formulas, or the like, as shown in the example above (see FIGS. 4, 1-2, 9).

Once we know the pressure, as explained above, we can find the weight. Then, as explained above, we have Z-number, which is a pair of (A,B), where A is the estimated value of the weight (expressed as Fuzzy Logic value), and B is the reliability for A (see FIGS. 4, 9). Please refer to the literature for the details of Z-number, including e.g., U.S. Pat. No. 8,311,973 (Ser. No. 13/423,758, invented by Prof. Lotfi Zadeh, the inventor of the current application).

Once weight of multiple objects are measured/known by our system. Then, if they move around on the floor, we can distinguish where each one is located at a given time, based on differences/distinguishing values on their weight values. The reliability factor is carried in Z-number for Z-casters, as B in the pair (A,B) representing the Z-number, as explained fully in U.S. Pat. No. 8,311,973. So, we can use this method or system for tracking people or objects on the floor/area/room, e.g., for security purposes (see FIGS. 4, 8-9). So, by assigning each weight to a person in the room, Z-casters are also useful for tracking/distinguishing people in a room reliably and efficiently.

Calibration:

For Z-casters on a 2D matrix/array on a pad on the floor, covering the floor, on a discrete manner at the nodes on the 2-dimensional arrays, each Z-caster may have different amount of materials in its container, or with other variations in the design or material or type of the sensor, varied intentionally or un-intentionally, or use Method 1 versus Method 2 type of pressure sensors, as mentioned above (or vice versa). Thus, the performance or calibration value/curve of each Z-caster may be different from its neighbors, even at the factory-level, which is very hard to uniformly normalize or set equal very accurately. So, we need a calibration adjustment for all Z-casters, to normalize all, making them comparable, on the same level, from the same base line for comparison.

Figure 11:
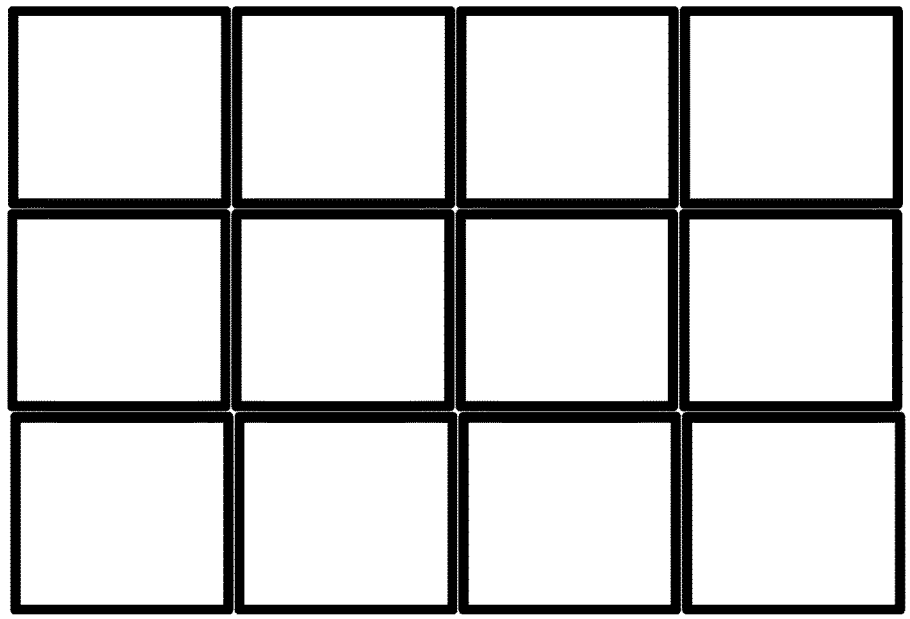
FIG. 11 is for one embodiment, as an example, for connected Z-casters on the floor, as modularized pieces.

To do that, in a first-order correction (in the linear region/domain), we choose an object as the calibration object, and move that in the 2D array on the mat/pad on the floor, both horizontally on x-axis (i elements) and then next row, to cover all the rows in 2D arrays on the floor, to cover for y-axis (j elements), for all the Z-casters (see FIGS. 3, 11).

In a first situation, as an example, we have chosen a small enough object, that its footprint is within/smaller than the cross section of one of the Z-casters. So, it only affects one Z-caster at a time, when centered at the nodes of 2D arrays/matrix. Assuming a node with a coordinate of (i,j) in 2D space, the weight measured at that node, $W_0(i,j)$, must be the same for all nodes. (We assume that we know or we can measure the cross sections/areas of all containers, or the cross sections/areas of all containers are the same, to be able to convert from the pressure value to the weight value.) Thus, to normalize based on $W_0(0,0)$, the origin node, from now on, any weight measured at the coordinate of (i,j), or W(i,j), should be scale-corrected or normalized (for a first-order correction) by multiplying that value by a factor of $[W_0(0,0)/W_0(i,j)]$. That is:

$$W_{normalized}(i,j)=W(i,j)[W_0(0,0)/W_0(i,j)]$$

Now, in a second situation, as an example, if the base area or footprint of the calibration object is bigger than the cross section or area of a Z-caster, then in some situations (e.g., if the line/1D dimension of the footprint of the calibration object is 1.5 times bigger than that of the cross section or area of a Z-caster), it can cover/cross/overlap 4 neighboring Z-casters, e.g., 4 nodes at 4 coordinates (see FIG. 3): (i,j), (i+1,j), (i,j+1), (i+1,j+1).

Then, the contribution for the total weight comes from 4 neighboring Z-casters (4 nodes). Let's assume that the normalization factor (for a first-order correction) for each node (i,j), (i+1,j), (i,j+1), (i+1,j+1), with respect to the origin node, is N(i,j), N(i+1,j), N(i,j+1), N(i+1,j+1), respectively, to correct the weight. Then, we have, for the total weight, contributed from 4 nodes, W(i,j), W(i+1,j), W(i,j+1), W(i+1,j+1):

$$W_{total}(i,j)==W(i,j)N(i,j)+W(i+1,j)N(i+1,j)+W(i,j+1)N(i,j+1)+W(i+1,j+1)N(i+1,j+1)$$

Assuming the position was set to be centered on or symmetric with respect to those 4 nodes (in order to be reproducible), then the 4 partial weights are equal (i.e., equal to $[(W_{total}(i,j))/4]$). So, now, we have:

$$4 = N(i,j) + N(i+1,j) + N(i,j+1) + N(i+1,j+1)$$

Now, assume that i ranges from 0 to I and j ranges from 0 to J. That is, we have an array of $[(I+1)\times(J+1)]$, with $((I+1)(J+1))$ nodes on it. We can write equations similar to the one above for $W_{total}(i,j)$ for other rows or columns. We have (I.J) as the number/count of those similar equalities/equations for $W_{total}(i,j)$. So, we have (I.J) number of constraints. We are also interested in (I.J) as the number of $N(i,j)$ values, in the set of equations above, for various i and j. This means that we have (I.J) number of unknowns for $N(i,j)$, which corresponds to (I.J) number of constraints/equalities/equations, which one can solve to find all $N(i,j)$ values (for all Z-casters), to be used for future after calibration, to correct/normalize the values of the weight measurements for each Z-caster.

Please note that the Z-caster is a partial area of the whole pad, in one embodiment. So, the force gets distributed, and only some of that is applied to the Z-caster(s), in those situations. Thus, in those examples, we will register part of the weights, and that ratio or portion or percentage should be taken into account, for calculating pressure and total weight of the object (as the inverse of that ratio).

Dual-Sensors in Each Z-Caster Unit:

In one embodiment, we have a pair of (i.e., 2) pressure sensors in each Z-caster unit. The first one is a coarse sensor (i.e., not very accurate and not precise value), and acts as a switch, with a threshold for being ON/OFF, just to indicate that an object is present or not. This just verifies that the object is there, and confirms only the existence of the object, with no weight measurements (see FIG. 7).

The second one is finer and better calibrated sensor, i.e., more expensive one/better one, used for precise weight measurement, but the second one only gets activated (and being read by the central processor), when the first sensor detects the object in the first place, to trigger the second sensor to work/measure, to conserve the overall system resources for the second sensors, when not needed (i.e., when the first sensor does not detect any object in the first place, there is no need to measure accurately or in a fine manner, by the second sensor, and the second sensor circuitry and activity is off or idle).

So, for (I×J) array of 2D Z-casters (see FIG. 3), we will have (2 (I.J)) number of sensors, with half as the first type of sensors, and the other half the second type of sensors, as discussed in the previous paragraph. The 2-step process using a pair of sensors in each Z-caster makes the process less expensive and more efficient, as the second type of sensors are usually not activated or called upon, because there is no weight detected on them in the first place. So, overall, the pad on the floor with all the Z-casters is more efficient and more cost-effective. (Each sensor is connected to the processor separately, in one embodiment.)

Each Z-caster is connected to the central processor or computer, either directly or indirectly through other Z-casters, for communication, control, decisions, instructions, sensors, reporting results, or the like. The reporting or the results can be aggregate or average result/value, or individually, per Z-caster (see FIGS. 3-4).

The power needed to run the Z-caster either comes directly from the source, such as power line or battery or generator, or indirectly through other Z-casters. When the electric power comes indirectly through other Z-casters, the voltage or current may get distributed in series, parallel, or in combination, through the 2D arrays to each Z-caster (see FIGS. 3-4), which costs less or easier for the connections to each Z-casters, but the drops/reductions in current or voltage for/due each unit should be taken into account, which sets constraints on the source of the electric power or energy, e.g. requiring higher voltage or current at the source.

The brain or processor or decisions made can be centrally through a central computer, or remotely, or through other Z-casters, or within a given Z-caster, itself, making it less dependent on central processor and more independent/resilient on disruptions, but at the same time, requiring more expensive hardware and software added into each Z-caster, for local processor (and processing decisions locally) within each Z-caster.

In one embodiment, the decision to go/proceed from the first type of sensor to the second type of sensor is done locally, per/for each Z-caster, at each Z-caster. So, the switch action for the first type of sensor is done at a given Z-caster, and the result affects the second type of sensor locally on the same Z-caster, without using or going through the central processor or computer.

In one embodiment, the bus or ground wires or cables or power lines or communication lines or signal lines or instruction lines for all Z-casters are positioned in a rectangle shape, around the outside of the pad, attached to the pad, framing that pad, with the horizontal and vertical lines/extensions going to each Z-caster in a horizontal and vertical cross-hatched manner (see FIGS. 3-4), parallel to X and Y axes for the pad or room, embedded inside the thickness of the pad, with padding around it for protection. In one embodiment, the communication is analog signal. In one embodiment, the communication is converted to digital signal/data.

In one embodiment, the communication and connection to each Z-caster or sensor is based on the conventional method used for accessing data and input/output for 2D screen of computers or pads or smart phones, which use their output screen or display as input port by fingers or stylus, as well, i.e., touch-screen capability for the display of computers or pads or smart phones. So, in one embodiment, the input/output/power/signal access/communication of each Z-caster are exactly the same as those of the pixels of the conventional touch-screen computer display, which is well-known in industry. For example, see:

https://en.wikipedia.org/wiki/Touchscreen

This also shows many variations of the technology of touchscreen (with different methods of sensing touch), e.g., Resistive type, Surface Acoustic Wave type, and Capacitive type.

Figure 13:
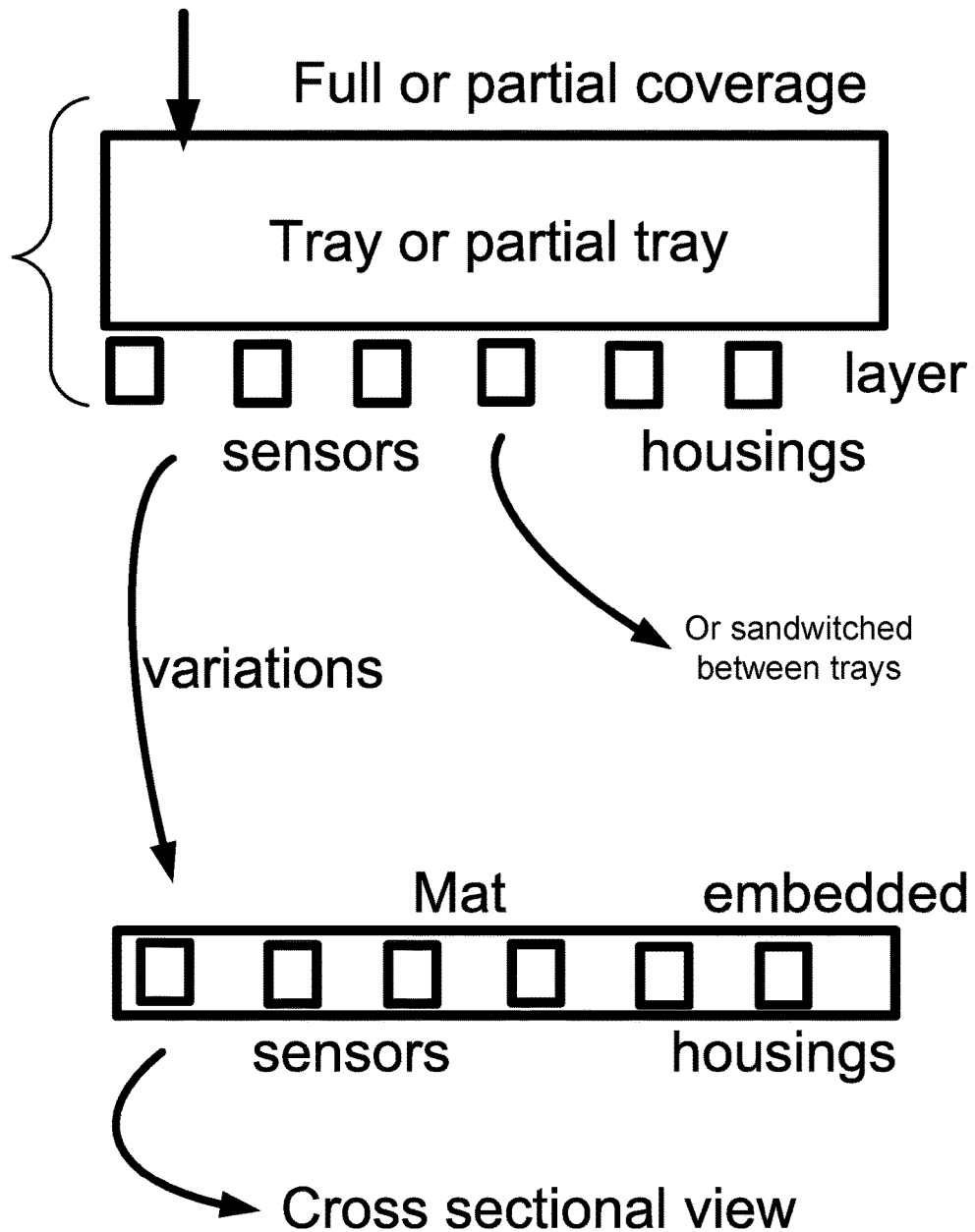
FIG. 13 is for one embodiment, as an example, for an installed Z-casters using a tray or pad.

In one embodiment, the Z-casters are positioned inside the mat (see FIG. 13). In one embodiment, the Z-casters are positioned under the mat. In one embodiment, the Z-casters are positioned between two trays, sandwiched, to distribute the weight or pressure across the tray.

In one embodiment, we have a system for tracking of people in a room, with the system comprising: a floor mat on a floor of said room; multiple pressure sensor housings, arranged in two-dimensional arrays in X and Y axes, parallel to plane of said floor, distributed over and covering said floor; wherein said multiple pressure sensor housings are embedded in said floor mat; wherein a first of said multiple weight sensor housings comprises two pressure sensors of two types, named first-type pressure sensor and second-type pressure sensor, wherein said first-type pressure sensor is a coarse pressure sensor (e.g., with accuracy of plus/minus 10 N of force, when calculating the weight); wherein said second-type pressure sensor is a fine pressure sensor (e.g., with accuracy of plus/minus 0.1 N of force, when calculating the weight); wherein said second-type pressure sensor is more accurate and better calibrated pressure sensor than said first-type pressure sensor, wherein said first-type pressure sensor acts as a switch and indicates existence of a person, based on a threshold on a weight value (e.g. anything above 50 N of weight, as the threshold, being considered as ON, as a switch, i.e., the presence of an object on the mat/pad) detected by said first-type pressure sensor; wherein when said first-type pressure sensor indicates existence of a person, then said second-type pressure sensor gets activated (e.g., using a JFET switch/transistor (Junction-Gate Field-Effect Transistor), or a MOSFET (Metal-Oxide-Semiconductor Field-Effect Transistor), or more examples/circuits given in the section below) in the second-type pressure sensor's circuit, to activate the second-type pressure sensor), to take weight measurement of said person; a central computer or processor; wherein said central computer or processor receives said indication of existence of said person from said first-type pressure sensor; wherein said central computer or processor receives said weight of said person from said second-type pressure sensor; wherein said first-type pressure sensor comprises a first container; wherein said second-type pressure sensor comprises a second container; wherein said first container comprises first material; wherein said second container comprises second material; wherein said first material has a specific electrical resistivity value which is a function of pressure or weight exerted on said first material, expressed as a Z-number, wherein Z-number is a pair of (A,B), where A is Fuzzy value for said weight and B is the reliability for A (as expressed as the Z-number format, as opposed to the conventional format, e.g., as 90 percent reliable data); wherein said second material has a specific electrical resistivity value which is a function of pressure or weight exerted on said second material, expressed as a Z-number, wherein said second-type pressure sensor is calibrated using a calibration object which is placed on said first of said multiple weight sensor housings and three of its immediate neighboring housings among said multiple weight sensor housings.

For example, the accuracy of the second-type pressure sensor is better than 99 percent, while the accuracy of the first-type pressure sensor is within 50 percent. So, for the first-type pressure sensor, any deltas/changes of e.g. 1-2 percent is ignored, as "no change", but any deltas/changes of e.g. 100-200 percent is considered a presence of an object on the sensor, without being exact and without reporting the exact numerical value for the first-type pressure sensor.

Please note: The numbers given above/below/here are just examples, and not limiting at all, as the teaching has no bounds on the range of values here.

When said first-type pressure sensor indicates existence of a person, then said second-type pressure sensor gets activated to take weight measurement of said person. The activation can come by e.g. a switch turn on a circuit or activate a transistor, or making a certain voltage or producing a certain current, or passing a threshold in a non-linear circuit with diodes or transistors, or by passing a threshold on a second circuit activating another device, circuit, or process, e.g., as a current flow or transistor becoming ON, or the like. The activation can also come by a software or hardware means/methods, e.g., a processor or controller or computer send a signal, flag, code, or instruction, to make another circuit or device work or get activated or get current or voltage across terminals, or activating a circuit/transistor, as are well-known in the art. For examples, please refer to the book Horowitz et al. ("The art of electronics", published by Cambridge U. Press, 1980, referring to many parts of the book, e.g., Chapter 2, pages 50-92, and pages 172-223, 223-257, 262-313), or its corresponding Laboratory Manual of the same book by Horowitz et al. ("Laboratory Manual for The art of electronics", published by Cambridge U. Press, 1983, referring to many parts of the book, e.g., Chapters/Labs number 3-9), or the book Sedra et al. ("Micro-Electronic Circuits", by CBS College Publishing, 1982, e.g., Chapters 3-4, 7-8), for details and variations known and used in the industry for these purposes.

Figure 14:
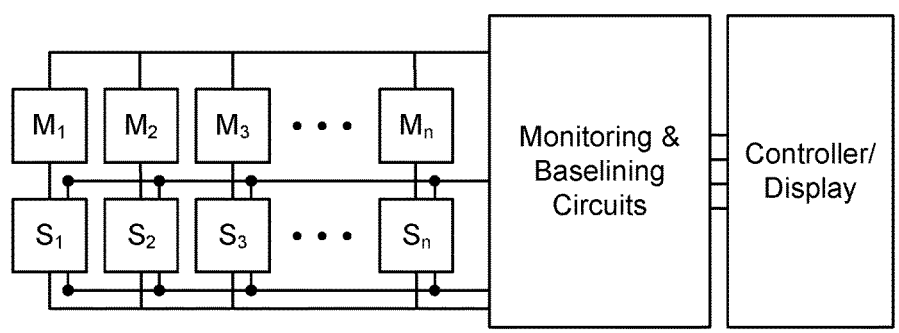
FIG. 14 depicts an embodiment of the invention with multiple pressure sensitive units (e.g., M1, M2, . . . , Mn) each arranged in series with corresponding switch (S1, S2, . . . , Sn), sharing common bus connection(s) to a monitoring and baselining module/circuit and a controller/display unit(s).

Other examples are given for same purposes in Appendix 3. For example, see FIGS. 9-18 of Appendix 3, especially FIGS. 13 and 15 of Appendix 3 for the same purposes. FIG. 14 also shows another example for the same purposes.

Figure 4:
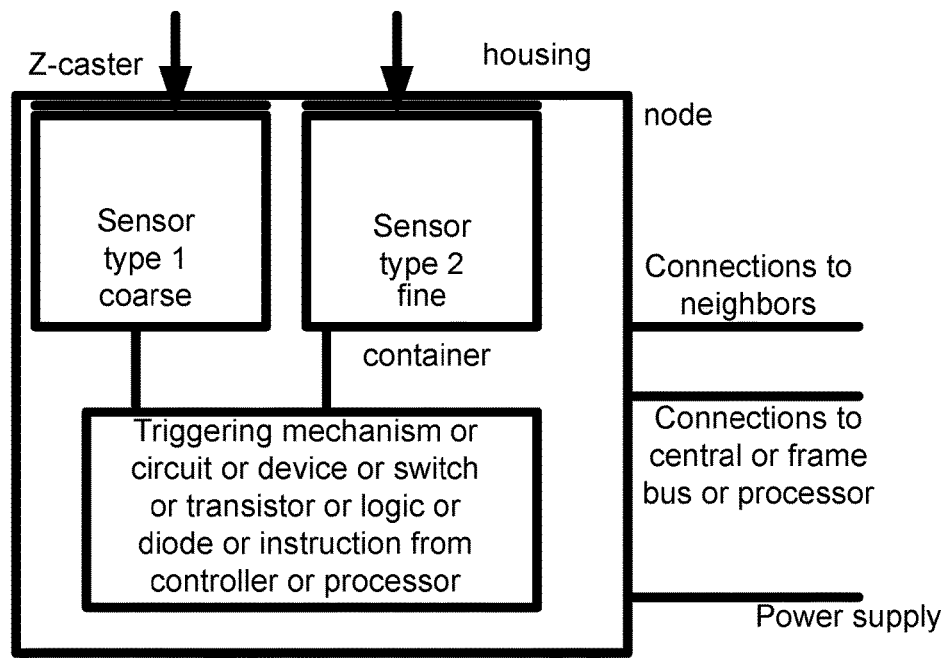
FIG. 4 is for one embodiment, as an example, for a system of the Z-caster.

FIG. 1 is for one embodiment, as an example, for container for Method 1. FIG. 2 is for one embodiment, as an example, for container for Method 2. FIG. 3 is for one embodiment, as an example, for 2D array of sensors/Z-casters on the floor. FIG. 4 is for one embodiment, as an example, for a system of the Z-caster.

Figure 5:
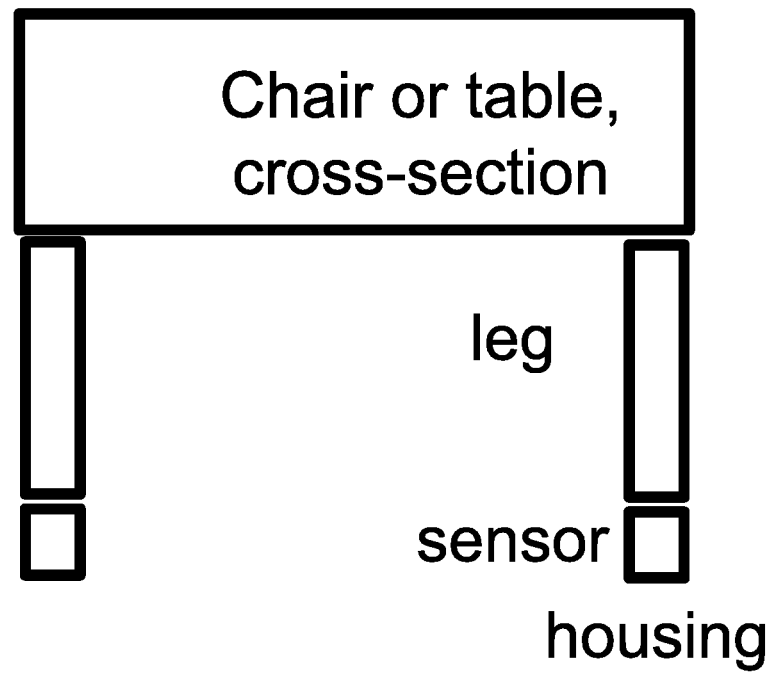
FIG. 5 is for one embodiment, as an example, for an installed Z-caster on a table's or chair's leg.
Figure 6:
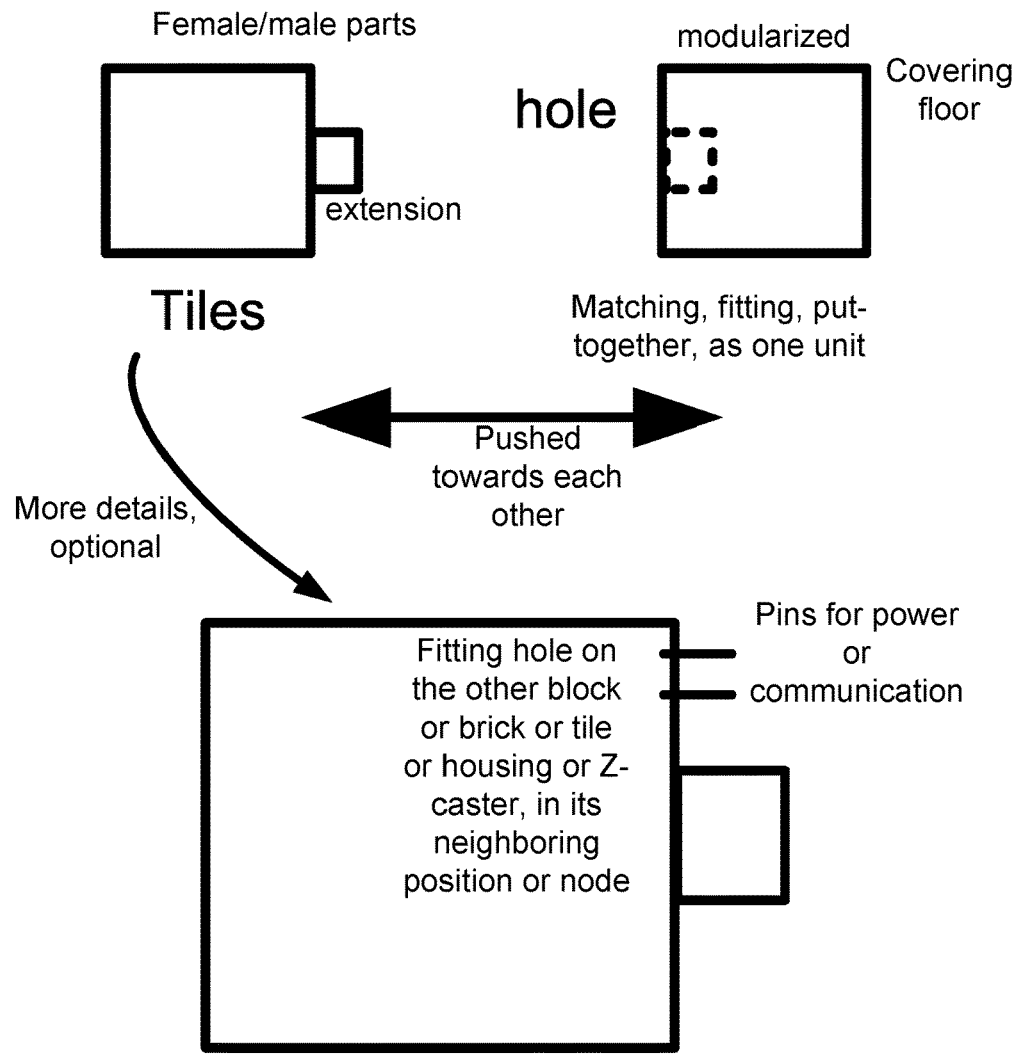
FIG. 6 is for one embodiment, as an example, for connected Z-casters on the floor, as modularized pieces.
Figure 7:
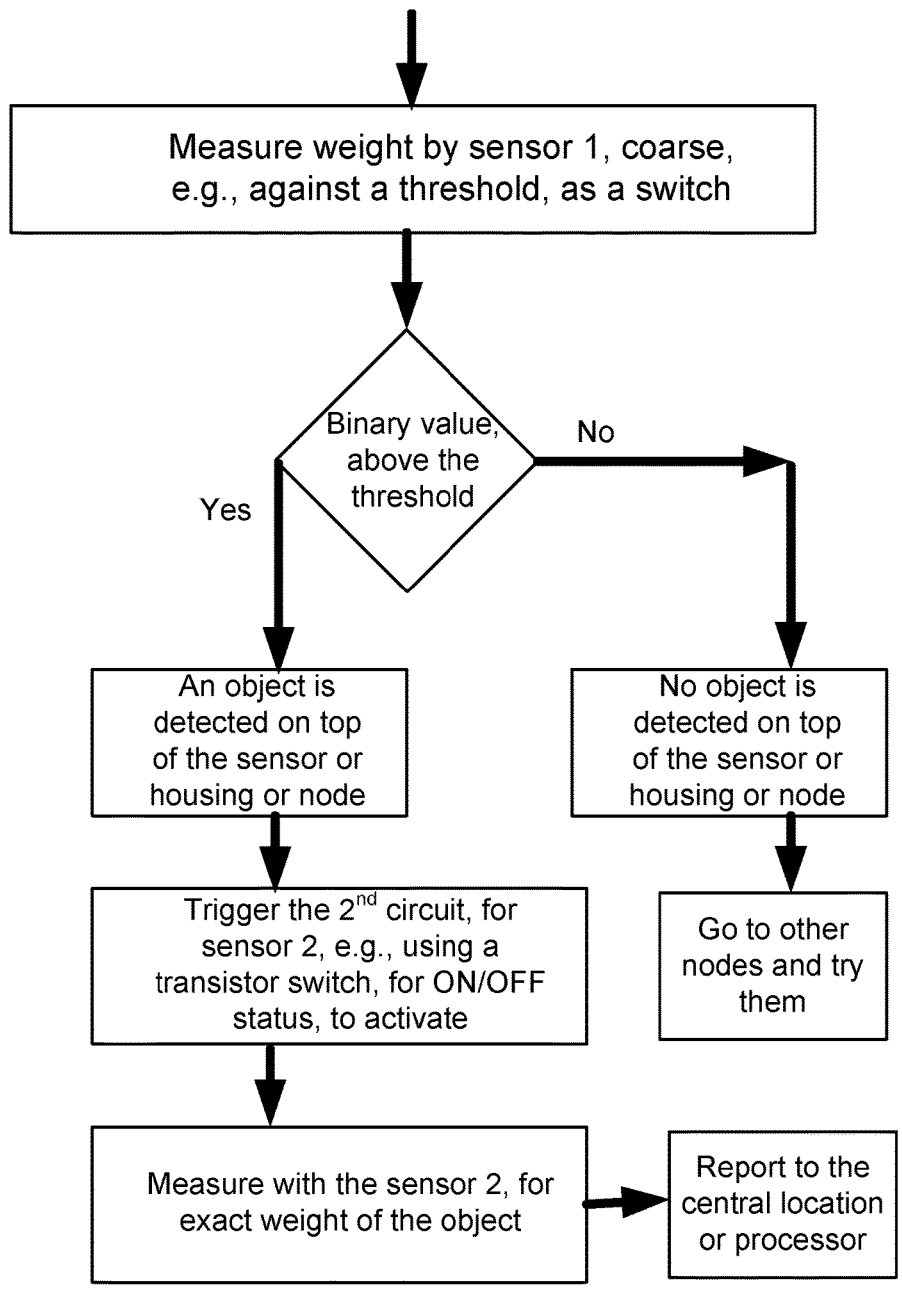
FIG. 7 is for one embodiment, as an example, for process of sensors 1 and 2 (types 1-2).
Figure 8:
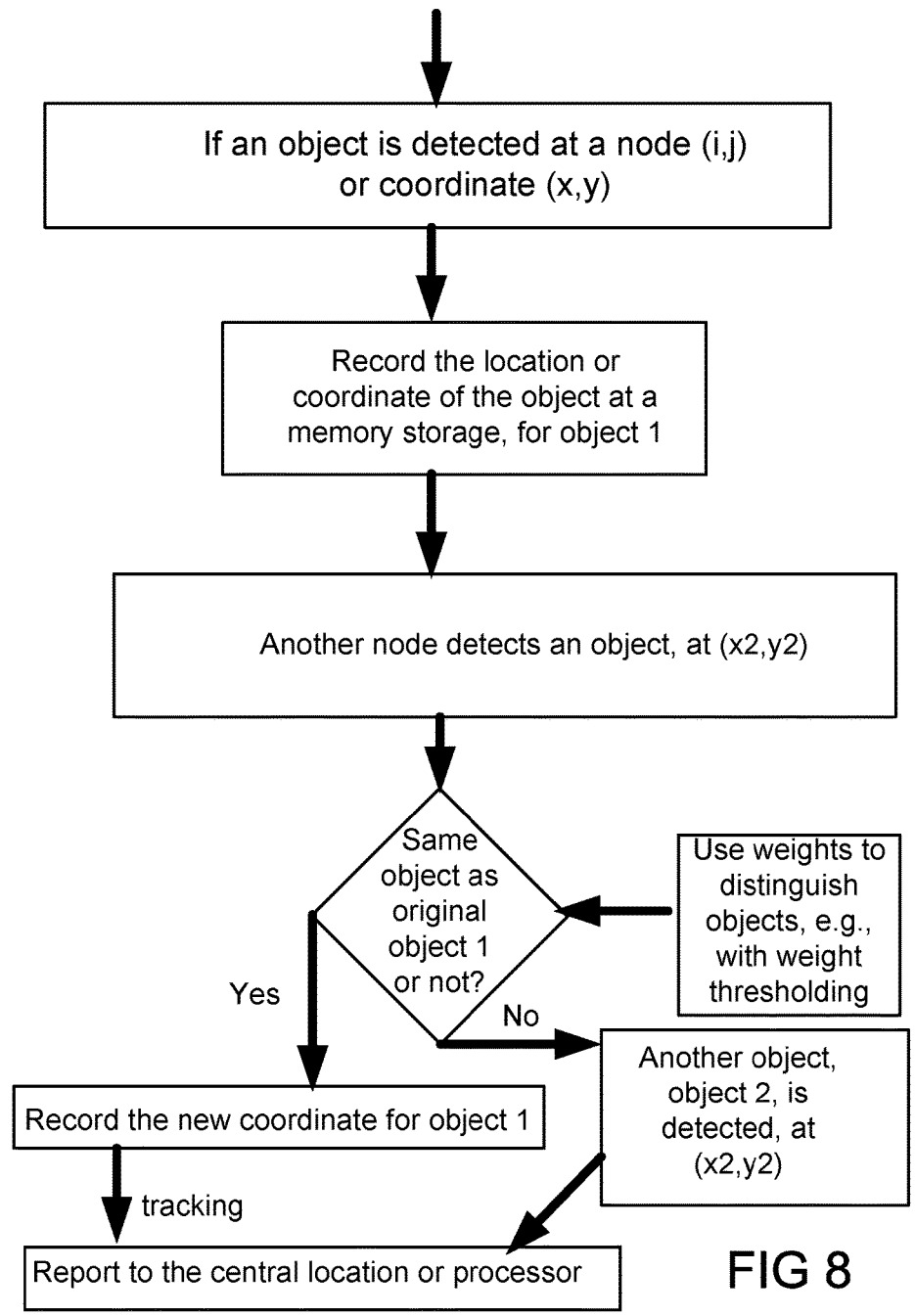
FIG. 8 is for one embodiment, as an example, for process of tracking.

FIG. 5 is for one embodiment, as an example, for an installed Z-caster on a table's or chair's leg. FIG. 6 is for one embodiment, as an example, for connected Z-casters on the floor, as modularized pieces. FIG. 7 is for one embodiment, as an example, for process of sensors 1 and 2 (types 1-2). FIG. 8 is for one embodiment, as an example, for process of tracking.

Figure 9:
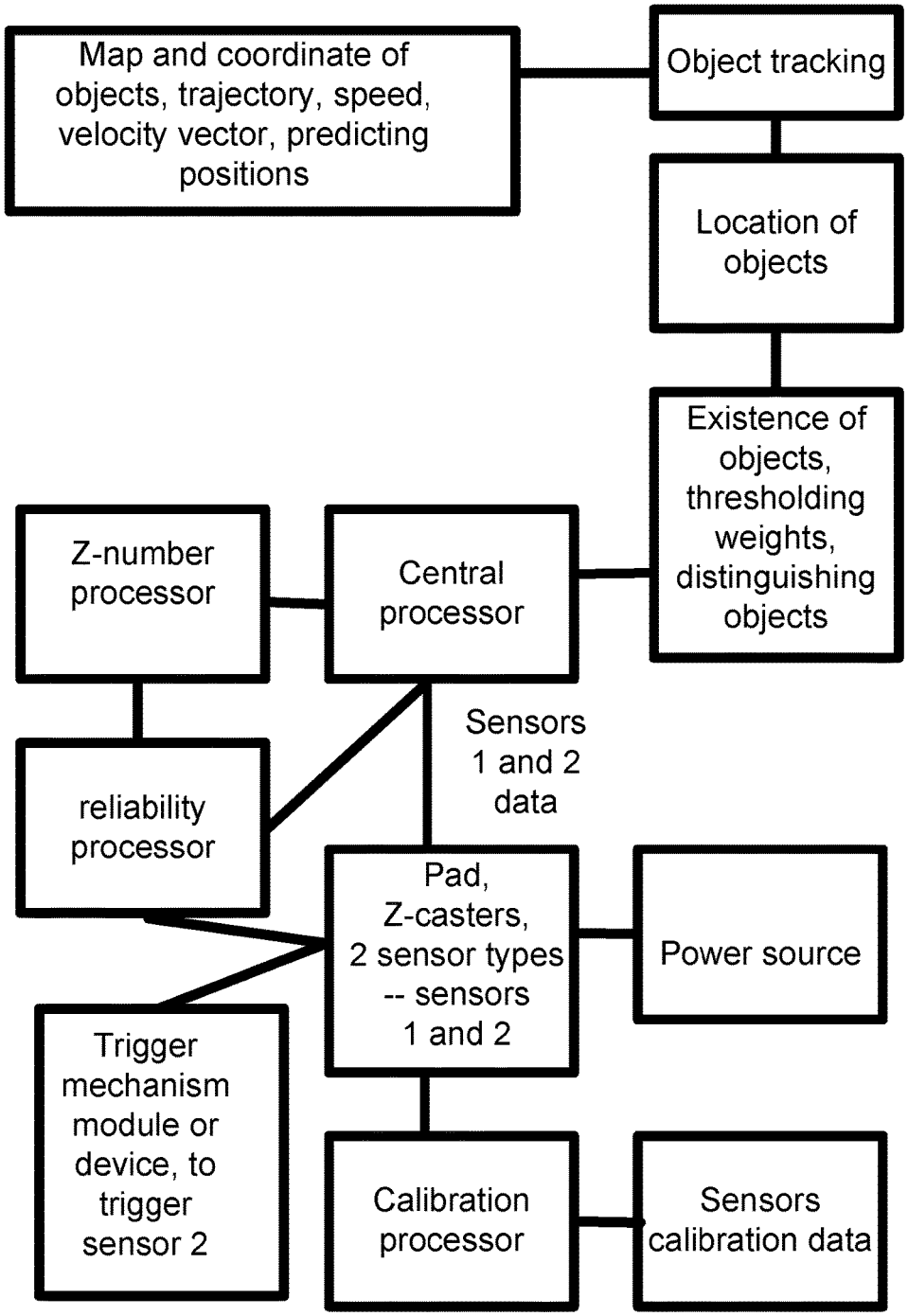
FIG. 9 is for one embodiment, as an example, for overall system.
Figure 10:
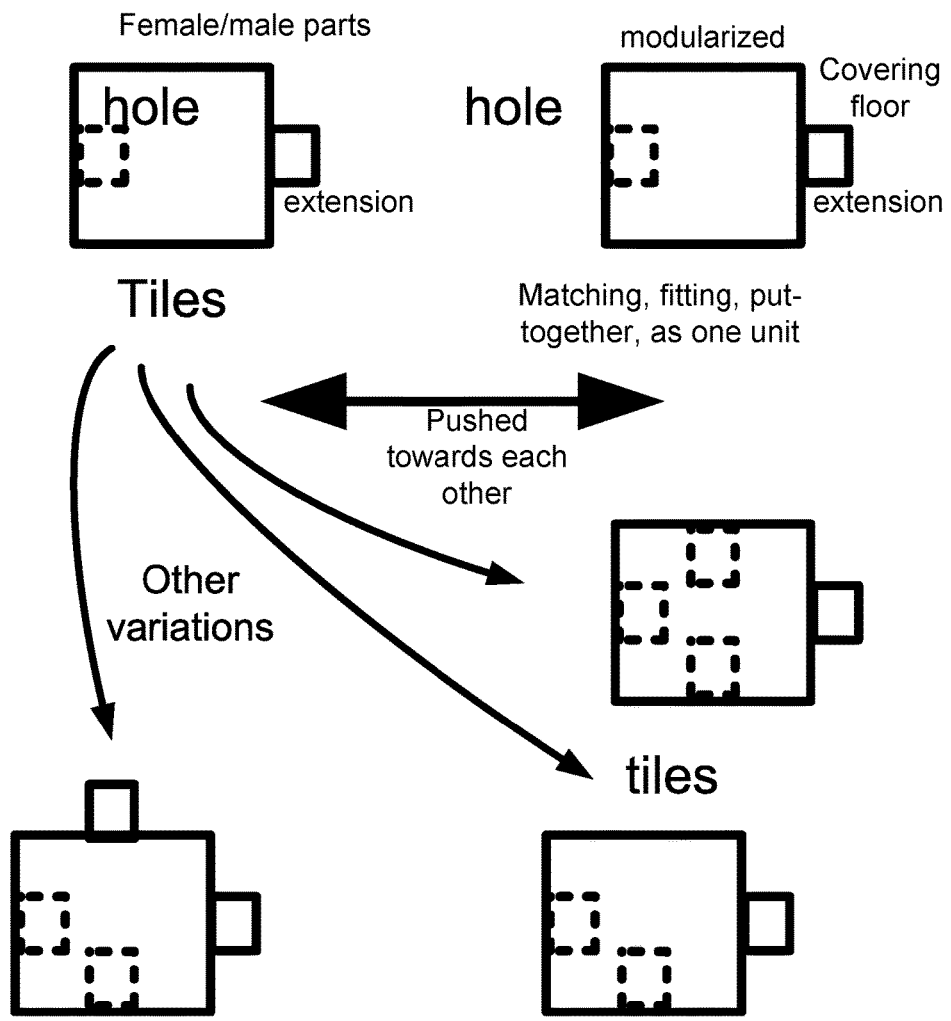
FIG. 10 is for one embodiment, as an example, for connected Z-casters on the floor, as modularized pieces.
Figure 12:
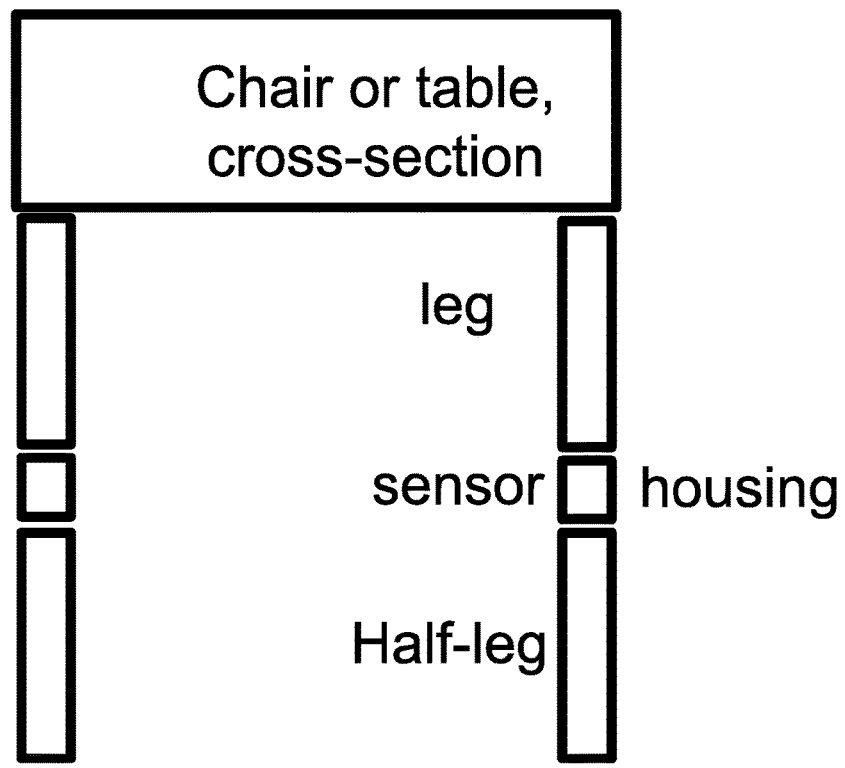
FIG. 12 is for one embodiment, as an example, for an installed Z-caster on a table's or chair's leg.

FIG. 9 is for one embodiment, as an example, for overall system. FIG. 10 is for one embodiment, as an example, for connected Z-casters on the floor, as modularized pieces. FIG. 11 is for one embodiment, as an example, for connected Z-casters on the floor, as modularized pieces. FIG. 12 is for one embodiment, as an example, for an installed Z-caster on a table's or chair's leg. FIG. 13 is for one embodiment, as an example, for an installed Z-casters using a tray or pad.

In one/another embodiment, sensors 1 and 2 are not necessarily at different grades and quality or precision accuracy. That is, they may or may not be of the same precision accuracy. Then, the advantage of using sensors 1 and 2 is that there is no addressing line needed for each housing, because the decision for each housing is made locally, in the same housing unit, rather than centrally/remotely using the address line/bus. So, the decision for the housing is done/made at the same exact housing unit, and that is the novelty of that circuitry, as shown in FIG. 14.

In other embodiments, we have a system for tracking of people in a room, with the following variations or features, as examples of implementations:

wherein said first material has piezoelectric effect, producing electric charges as a function of pressure or weight exerted on said first material, expressed as a Z-number; wherein Z-number is a pair of (A,B), where A is Fuzzy value for said weight and B is the reliability for A; wherein said second material has piezoelectric effect, producing electric charges as a function of pressure or weight exerted on said second material, expressed as a Z-number.

a memory unit to record locations of said person (see FIGS. 7-9).

a data transfer bus around circumference of said floor mat.

a data transfer bus inside thickness of said floor mat.

a partial tray on top of said floor mat.

said floor mat comprises plastic or elastic substance.

said first of said multiple weight sensor housings is a flexible housing or substance.

said first container is a flexible container or substance.

said first of said multiple weight sensor housings communicates with a second of said multiple weight sensor housings.

said first of said multiple weight sensor housings communicates with all its immediate neighboring housings of said multiple weight sensor housings.

Other Examples of Circuits/Devices Used Here for this Invention:

Some more examples of circuits/devices used here for this invention are shown in Appendix 4 (the file marked as "Appendix 4"), as discussed below in details:

Appendix 4, page 1 (FIG. 7.1 of the reference) depicts an example of autonulling amplifier that uses a buffer amplifier (using $U_1$) to provide the input signal voltage to 10/100/1000 amplifier ($U_2$). The autonulling is achieved by first sending "hold" level signal to a switch circuitry that closes the consecutive switches $Q_1$ and $Q_2$ and electrically provides a path from output of $U_2$ to operational amplifier ($U_3$), and thereby provides an additional feedback $U_2$. Given the virtual ground at the inverting input of $U_3$, the output of $U_2$ is driven to zero when $U_3$ adjust the voltage at the non-inverting input of U2 through the resistor voltage divider. Capacitor $C_1$ holds the voltage on the output of $U_3$ by providing a negative feedback to $U_3$'s inverting input, so that when the "hold" signal level is changed to "run" and $Q_1$ and $Q_2$ switches become electrically open (thereby severing the electrical feedback from $U_2$'s output), $U_3$ still maintains the same output voltage and provide the same reference voltage at the non-inverting input of $U_2$. This provides a baseline level at the non-inverting input of $U_2$ (as well as its inverting input due to the negative feedback) letting $U_2$ amplify the changes in the output of $U_1$ (compared to when the baseline was taken). Given that the baseline is held via $C_1$, to avoid the drifting of the baseline due to the leakage through $C_1$, an additional circuit is provided (using $U_4$) that compensates the leakage, by sampling and inverting the output of $U_3$ and providing a small fraction of it (via resistor voltage division) as negative feedback (already inverted by $U_4$) to the inverting input of $U_3$ to compensate the capacitor leakage effect during the "run" mode. Adjustable resistor $R_{20}$ can be used to adjust the leakage compensation.

In addition, the switch circuitry in the hold mode turns on $Q_5$ and drives it to saturation, thereby creating high voltage on resistor $R_{25}$ which turns on $Q_3$ and $Q_4$ and drives them to saturation. With $Q_3$ and $Q_4$ collector voltages reaching near lowest level (−15 volts), both $Q_1$ and $Q_2$ (enhancement mode p-channel MOSFETs) turn on closing the switch and providing electrical path from $U_2$'s output through $R_{22}$ to inverting input of $U_3$. In the run mode, the switch circuitry turns off $Q_5$ as well as $Q_3$ and $Q_4$, which causes the gate voltage of $Q_1$ and $Q_2$ reach 0 and +15 volts, respectively, and turn off both $Q_1$ and $Q_2$.

Appendix 4, page 2 (FIG. 6.54.A-C of the reference), page 3 (FIG. 6.34 of the reference), and page 4 (FIG. 6.35 of the reference) depict examples of switches via MOSFETs and JFET. Appendix 4, page 5 (FIG. 6.39 of the reference) depicts an examples of inverter using MOSFETs.

Please note that Appendix 4 came from the book Horowitz et al. ("The art of electronics", published by Cambridge U. Press, 1980, referring to many parts of the book, e.g., Chapter 2, pages 50-92, and pages 172-223, 223-257, 262-313), with the Fig. or page numbers shown there in Appendix 4, referring to the same in the book Horowitz et al.

Our Other Examples of Circuits/Devices Used Here for this Invention:

Some more examples of our circuits/devices used for this invention are as follows:

FIG. 14 depicts an embodiment of the invention with multiple pressure sensitive units (e.g., $M_1$, $M_2$, . . . , $M_n$) each arranged in series with corresponding switch ($S_1$, $S_2$, . . . , $S_n$), sharing common bus connection(s) to a monitoring and baselining module/circuit and a controller/display unit(s). In one embodiment, the switches are sensitive to weight. In one embodiment, the switch electrically closes when the weight exceeds a threshold weight. In one embodiment, the threshold weight is adjustable. In one embodiment, the open switch presents large impedance/resistance such that the effective impedance/resistance of $S_i$-$M_i$ series combination is large enough so not to significantly reduce the effective resistance/impedance of parallel arrangement of other S-M units when one or more of these units have their S units in the ON/close mode.

Please note that a pair of S-M refers to the dual/double sensors, mentioned elsewhere in this disclosure, for one embodiment. The sensors in general may or may not have similar or improved accuracy or sensitivity with respect to each other, for different embodiments.

Figure 15:
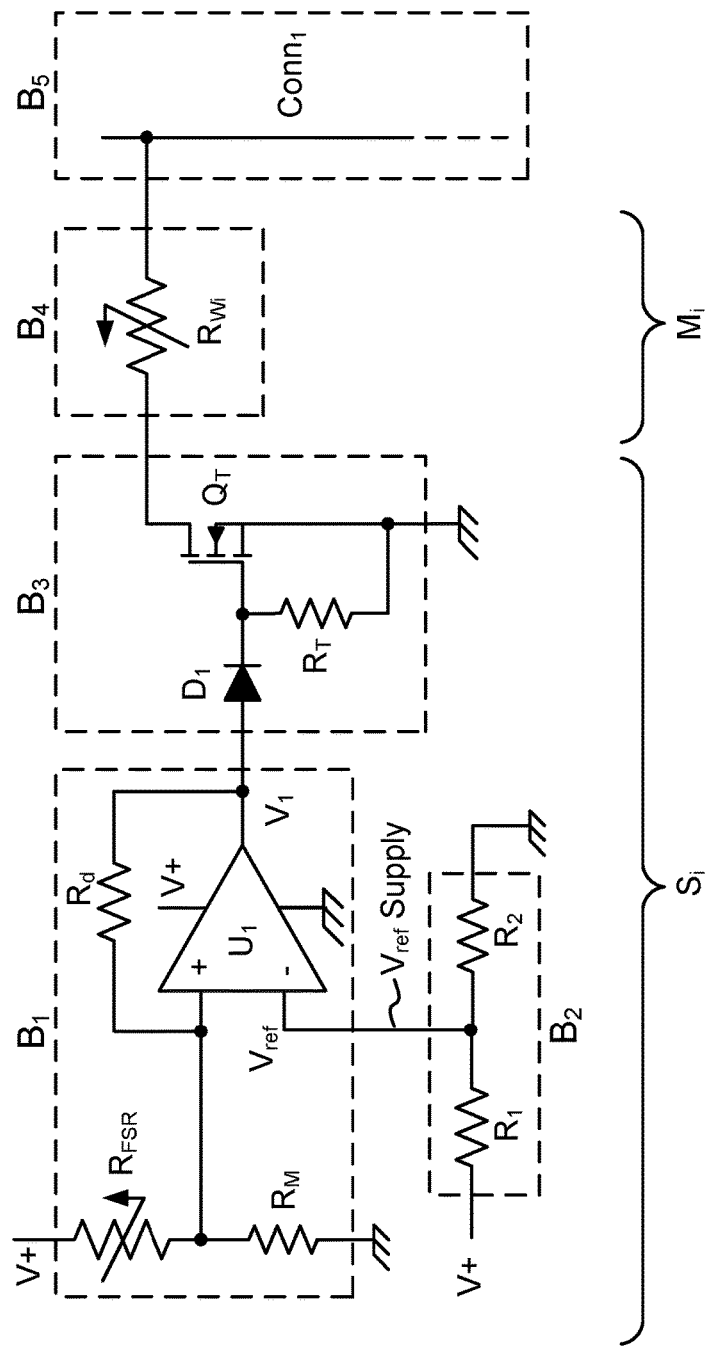
FIG. 15 depicts an embodiment on the invention where a force sensitive resistor RFSR is used to detect the presence of weight (exceeding a threshold), by for example, detecting if the reduction in RFSR resistance (e.g., due to force/pressure) causes the resistor voltage division between RFSR and resistor RM exceeds a reference voltage Vref, for example, by using an operational amplifier in comparison mode with the voltage division and Vref provided to the inputs of the operational amplifier U1.

FIG. 15 depicts an embodiment on the invention where a force sensitive resistor $R_{FSR}$ is used to detect the presence of weight (exceeding a threshold), by for example, detecting if the reduction in $R_{FSR}$ resistance (e.g., due to force/pressure) causes the resistor voltage division between $R_{FSR}$ and resistor $R_M$ exceeds a reference voltage $V_{ref}$, for example, by using an operational amplifier in comparison mode with the voltage division and $V_{ref}$ provided to the inputs of the operational amplifier $U_1$. In one embodiment, $R_d$ is provided in the feedback (to non-inverting input of $U_1$) to eliminate multiple triggering of the op-amp output and act as a debounder by further moving the voltage at the non-inverting input of $U_1$ away from $V_{ref}$ in the same direction as the resistor voltage division crosses $V_{ref}$.

In one embodiment, $V_{ref}$ is setup via a resistor voltage division (e.g., as shown by $R_1$ and $R_2$). In one embodiment, a variable resistor (or potentiometer) is used to set $V_{ref}$. In one embodiment, $V_{ref}$ is setup or adjusted to where the conductance of pressure sensitive $R_{FSR}$ reaches its semi-linear range with respect to the pressure.

For example of elements of Block $B_1$ and their values, see Appendix 3.

In one embodiment, $V_{ref}$ is provided (e.g., via Block $B_2$) to comparison circuit (e.g., Block $B_1$) within the same unit (e.g., Z-caster). In one embodiment, $V_{ref}$ is setup separately and supplied to multiple units via an electrical connection path. In one embodiment, such an electrical path is constructed by connecting multiple Z-casters together (e.g., in a pad configuration) to, for example, form a common cascaded electrical lead. In one embodiment, the output of the comparison block $B_1$ is used to indicate whether the weight exceeds the threshold (e.g., $V_1$ close to V+ indicates exceeding threshold, given the reduction in $R_{FSR}$ increases the voltage division at the non-inverting input of $U_1$ to exceed $V_{ref}$. For example, V1 close to zero in this configuration indicates the weight is not exceeding the threshold). In one embodiment, the output of comparison circuit/module is provided to a controller or a CPU/memory module to indicate the presence or absence of the weight compared to a threshold. In one embodiment, the output of comparison circuit/module (e.g., $B_1$) is provided to another circuitry (e.g., $B_3$) to act as a switch to electrically open or close a path to another unit (e.g., $B_4$) used in monitoring/measuring the weight. For example, Block $B_3$ uses an enhancement mode MOSFET $Q_T$ used for switching driven, for example, by $V_1$. In one embodiment, $V_1$ drives $Q_T$ via diode $D_1$ with resistor $R_T$ connecting source and gate together for electrical path when the diode is off. In this configuration, for example, when $V_1$ is high (e.g., when weight beyond threshold is detected), the switch ($Q_T$) closes and the force/pressure-sensitive $R_{Wi}$ (in Block $B_4$) is electrically connected to (for example) low voltage (zero volt) rail through the switch. In other embodiments, other switching and/or comparison configurations are used. In one embodiment, $R_{Wi}$ electrically participates via connection ($Conn_1$) in Block $B_5$ when the switch is turned on (closed). In one embodiment, $Conn_1$ is partially or fully formed in cascade fashion by connecting Z-casters together, for example, in a pad configuration to for example form electrically parallel configuration. In one embodiment, Blocks $B_1$ and $B_3$ are in module $S_i$. In one embodiment, Block $B_2$ is in module $S_i$. In one embodiment, Block $B_2$ is shared. In one embodiment, Block $B_2$ is supplied separately from module $S_i$, through a supply path.

Figure 16:
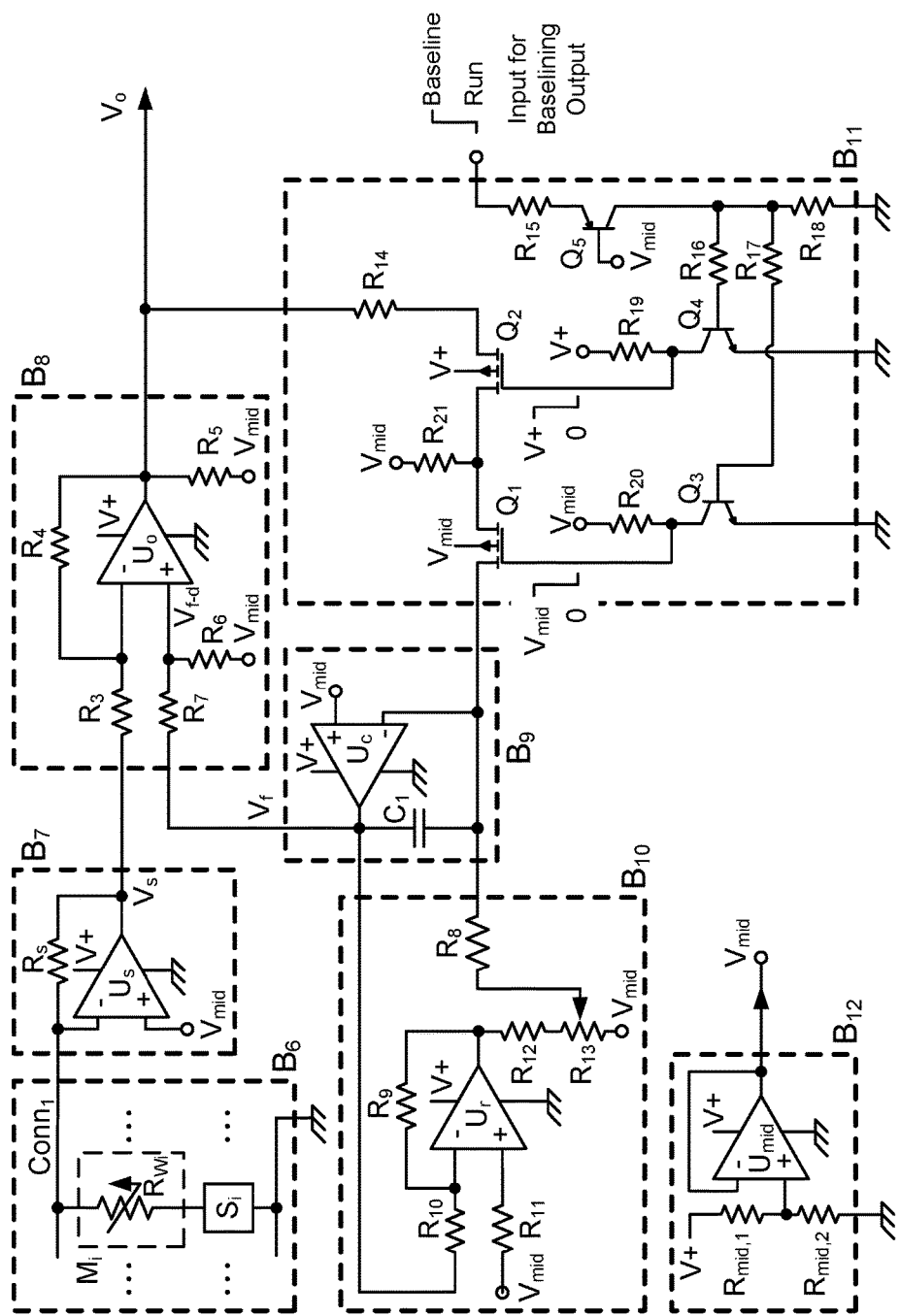
FIG. 16 depicts an embodiment of the invention where weight sensitive switch(es) (e.g., Si) with corresponding weight/pressure sensitive modules (e.g., RWi in Mi) are connected to electrical path Conn1 in Block B6, and further connected to Block B7 that integrates the signals from switched-on Mi units.

FIG. 16 depicts an embodiment of the invention where weight sensitive switch(es) (e.g., $S_i$) with corresponding weight/pressure sensitive modules (e.g., $R_{Wi}$ in $M_i$) are connected to electrical path $Conn_1$ in Block $B_6$, and further connected to Block $B_7$ that integrates the signals from switched-on $M_i$ units. In one embodiment, $B_7$ uses an operational amplifier $U_s$ to sum the currents from switched-on $M_i$ units via a negative feedback through resistor $R_s$ to impose $V_{mid}$ voltage on $Conn_1$ connected to the op-amp's inverting input (having $V_{mid}$ connected to its non-inverting input).

$$V_s - V_{mid} = V_{mid} \cdot R_s / R_{Eff}$$

where $(R_{Eff})^{-1} = Sum(R_{Wi})^{-1}$ over turned-on $M_i$ modules.

In the configuration shown for example in FIG. 16, the rail voltages are V+ and zero. In one embodiment, a middle voltage ($V_{mid}$) is setup between V+ and zero (e.g., half way), for example using an active element (e.g., via Block $B_{12}$ using operational amplifier $U_{mid}$ in buffer configuration with negative feedback and resistance voltage division via $R_{mid,1}$ and $R_{mid,2}$ at the non-inverting input of $U_{mid}$). $R_{mid,1}$ and $R_{mid,2}$ are made the same value to achieve half way voltage for $V_{mid}$ between V+ and zero. In another configuration, for example, two rail voltages (e.g., +15 volts and −15 volts or +6 volts and −6 volts) are used in place of V+ and zero, and zero voltage is used in place of $V_{mid}$, thereby not requiring Block $B_{12}$ to generate such voltage level.

With no $M_i$ modules being switched-on, $V_s$, the output of $U_s$, is equal or close to $V_{mid}$, reflecting no significant current through $R_s$. In one embodiment, when one or more $M_i$ modules is switched on, for example, via its corresponding $S_i$, the currents through such $M_i$ modules flow through $R_s$ due to the negative feedback configuration of $U_s$, with $(V_s - V_{mid})/R_s$ reflecting the sum of currents through switched-on $M_i$ modules on $Conn_1$. In one embodiment, Block $B_8$ is used to amplify signal reflecting a measure of the detected weight. In one embodiment, Block $B_8$ is used to baseline the output ($V_o$), so that the output reflects a measure of the weight change (compared to a baseline). In one embodiment, resistors $R_3$ and $R_4$ are used in negative feedback configuration with operational amplifier $U_o$ for signal amplification. In one embodiment, in place or in addition to $R_4$ a combination of resistors is used to let different levels of amplification be selected. In one embodiment a voltage level $V_f$ is introduced to Block $B_8$ to influence the voltage level ($V_{f-d}$) at the non-inverting input of $U_o$ through a resistance voltage division formed by $R_7$ and $R_6$, in order to set the baseline level at the output of $U_o$, for example, as follows:

$$V_{f-d} - V_{mid} = (V_f - V_{mid}) \cdot R_6 / (R_6 + R_7)$$

$$V_o - V_{f-d} = -(V_s - V_{f-d}) \cdot R_4 / R_3$$

In one embodiment, during baselining, $V_f$ is adjusted, so that $V_o$ will be equal or close to $V_{mid}$ indicating a baseline level at the output. In one embodiment, $V_o$ is used to control the voltage level of $V_f$ during baselining in a feedback configuration so to drive the level of $V_o$ to become $V_{mid}$. In one embodiment, the feedback in baselining mode is provided via an electrical path through a switch circuitry/module (e.g., as depicted in Block $B_{11}$) connecting $V_o$ to Block $B_9$ that is used to supply $V_f$. In one embodiment, $U_c$, in Block $B_9$, drives $V_f$, so that $V_o$ gets equal or close to $V_{mid}$, by imposing voltage level $V_{mid}$ at the inverting input of $U_c$ via negative feedback through capacitor $C_1$ (by charging/discharging the capacitor) while having $V_{mid}$ connected to its non-inverting input. The feedback via $V_f$ to drive $V_o$ through non-inverting input of $U_o$ is stable, due to the negative feedback configuration in $U_c$ which is within the feedback loop through the switch circuitry/module. During baselining mode, the fluctuations in $V_s$ are indirectly captured by $V_f$ in order to maintain $V_o$ at $V_{mid}$.

In one embodiment, when the mode is switched from baselining to run mode, the switch circuitry/module is opened, severing the electrical feedback from $V_o$ to Block $B_9$. In Block $B_9$, capacitor $C_1$ acting as a memory element, maintains the voltage in the negative feedback path for $U_c$ to maintain the same voltage level $V_f$ at its output as it was while in the baseline mode. In the run mode, $V_o$ is no longer driven to $V_{mid}$ by the feedback through the switch circuitry/module, but it follows the changes in $V_s$ given a steady (baselined) level of $V_{f-d}$ at the non-inverting input of $U_o$.

In one embodiment, in order for maintain stable $V_f$ in the run mode, the capacitor leakage in $C_1$ is compensated to maintain $V_f$ voltage level. In one embodiment, a leakage compensating circuit (e.g., Block $B_{10}$) is used. In one embodiment, $V_f$ is sampled via an inverting negative feedback configuration for $U_r$ (e.g., as shown in Block $B_{10}$). The output voltage of $U_r$ (with respect to $V_{mid}$) is further reduced via voltage division by resistors $R_{12}$ and $R_{13}$, in order to provide a feedback to $U_c$ through (e.g., a large resistor) $R_8$. In one embodiment, the adjustment to the leakage compensation is done via a potentiometer or a variable resistor (e.g., $R_{13}$). Given that this feedback is proportional to $(V_f - V_{mid})$ (due to Block $B_{10}$), it would compensate the capacitor leakage to the first order for various levels of $V_f$.

In one embodiment, the switch circuitry/module (e.g., Block $B_{11}$) uses an input (e.g., from a controller) to indicate the baselining or the run modes. In one embodiment, in baseline mode, the input turns on $Q_5$ and drives it to saturation, thereby creating high voltage on resistor $R_{18}$ which turns on $Q_3$ and $Q_4$ through $R_{16}$ and $R_{17}$, respectively, and drives them to saturation. With $Q_3$ and $Q_4$ collector voltages reaching near zero, both $Q_1$ and $Q_2$ (enhancement mode p-channel MOSFETs) turn on, thereby closing the switch and providing electrical path from $U_o$'s output through $R_{14}$ to inverting input of $U_c$. In one embodiment, in the run mode, the input indicating run mode turns off $Q_5$ as well as $Q_3$ and $Q_4$, which causes the gate voltage of $Q_1$ and $Q_2$ reach $V_{mid}$ and V+, respectively, and turn off both $Q_1$ and $Q_2$, severing the feedback from $V_o$ to $U_c$, through the switch circuitry/module.

In one embodiment, $U_c$ operational amplifier uses a FET-type input circuit (e.g., AD515K) to reduce its input current to the op-amp. In one embodiment, offset null inputs of $U_c$ are used to reduce the leakage current, e.g., via a resistor pot with variable pin connected to zero volt. The series arrangement of $Q_1$ and $Q_2$ serves the purpose of reducing the current leakage through $Q_1$ to very low levels. While the current leakage in $Q_2$ is low (e.g., in nA range), the current leakage is $Q_1$ is made much lower in the cascade configuration, e.g., as $Q_2$ leakage causes $V_{DS}$ across $Q_1$ to be only in mV range (e.g., with $R_{21}$ being 1M ohm), which causes the leakage through $Q_1$ to be extremely low and providing negligible leakage into $U_c$'s summing junction.

In one embodiment, the switch module is based on a relay. In one embodiment, the switch module is based on a manual mechanical switch. In one embodiment, the baseline/run mode is input from a relay or a mechanical switch.

In one embodiment, $R_s$ is chosen to keep the range of $V_s$ within the normal operating range of $U_s$ op-amp for the various usages or weight distribution and amounts (e.g., from Block $B_6$). In one embodiment, a selector is used to provide various choices for $R_s$ to span multiple ranges of use.

For typical example of the elements used in Blocks $B_8$ through $B_{11}$, see Appendix 4, page 1.

Other Examples of Materials Used for this Invention:

Some more examples of materials used for this invention are as follows:

As shown in Appendix 1, and detailed at this website, the black, carbon-filled, volume-conductive polyethylene film can be used here for this current invention:

https://www.caplinq.com/electrically-conductive-plastic-film.html

This shows an electrically conductive plastic film, Linqstat Electrically Conductive and Antistatic Plastic Film:

"CAPLINQ offers a range of LINQSTAT-branded electrically conductive and antistatic plastic film. Antistatic plastics typically have a surface resistance less than 100,000 ohms-per-square. Electrically conductive plastics start with a surface resistivity of less than 10,000 ohm-per-square and can go as low as 10 ohms-per-square.

LINQSTAT™ VCF, MVCF- and XVCF-Series electrically conductive plastic sheeting is a black, carbon-filled, volume-conductive polyethylene film designed to provide both physical and static protection in numerous semiconductor, electronics, and Smartcard applications. The different grade of materials allows users to cover a wide range of possible applications.

The film and its conductivity are unaffected by humidity and age. The film is heat-sealable, flexible and offers exceptional abrasion resistance. The film gives good thermal stability and has outstanding chemical resistance. LINQSTAT has a standard thickness range from 65-200 micron (0.0025 inch to 0.008 inch) and roll lengths and widths vary depending on application and requirement."

Some examples are given at:

https://www.caplinq.com/lingstat-mvcf-50000-ohms/sq-4-mil-mid-level-electrically-conductive-plastic-sheeting-mvcf-4s50k-series.html This shows LINQSTAT MVCF 50,000 Ohms/sq 4 mil conductive film (also shown in details in Appendix 2).

More information is available at the following websites:
https://en.wikipedia.org/wiki/Velostat
https://www.caplinq.com/blog/when-is-a-generic-brand-good-enough_5/

These describe that Velostat is a packaging material made of a polymeric foil (polyolefines) impregnated with carbon black to make it electrically conductive.

Tactile sensing was studied at the Automation and Robotics site, by Southampton:
http://www.southampton.ac.uk/~rmc1/robotics/artactile.htm It discusses the following materials/usages, which one or more of these can be used in our system(s)/invention(s) here (for/inside container for Z-caster):

Capacitive based sensors (e.g., "The use of a highly dielectric polymer such as polyvinylidene fluoride maximizes the change capacitance. From an application viewpoint, the coaxial design is better as its capacitance will give a greater increase for an applied force than the parallel plate design.")

Piezoelectric sensors (e.g., "Polymeric materials that exhibit piezoelectric properties are suitable for use as a touch or tactile sensors, while quartz and some ceramics have piezoelectric properties, polymers such as polyvinylidene fluoride (PVDF) are normally used in sensors. Polyvinylidene fluoride is not piezoelectric in its raw state, but can be made piezoelectric by heating the PVDF within an electric field. Polyvinylidene fluoride is supplied sheets between as 5 microns and 2 mm thick, and has good mechanical properties. A thin layer of metallization is applied to both sides of the sheet to collect the charge and permit electrical connections being made. In addition, it can be molded, hence PVDF has number of attraction when considering tactile sensor material as an artificial skin.")

Touch Sensing
Tactile Sensing
Slip
Touch sensor technology
Mechanically based sensors
Resistive based sensors
Force sensing resistors
Magnetic based sensors
Optical Sensors
Optical fiber based sensors
Strain gauges in tactile sensors
Silicon based sensors
Smart Sensors
Multi-stimuli Touch Sensors Other examples are given for materials for this invention in Appendix 3. Appendix 3 shows FSR (Force Sensing Resistor) by Interlink Electronics, which uses flexible substrate with printed semiconductor:

"Force Sensing Resistors (FSR) are a polymer thick film (PTF) device which exhibits a decrease in resistance with an increase in the force applied to the active surface. Its force sensitivity is optimized for use in human touch control of electronic devices. FSRs are not a load cell or strain gauge, though they have similar properties. FSRs are not suitable for precision measurements. The force vs. resistance characteristic shown in FIG. 2 of Appendix 3 provides an overview of FSR typical response behavior. For interpretational convenience, the force vs. resistance data is plotted on a log/log format. These data are representative of our typical devices, with this particular force-resistance characteristic being the response of evaluation part #402 (0.5" (12.7 mm) diameter circular active area). A stainless steel actuator with a 0.4" (10.0 mm) diameter hemispherical tip of 60 durometer polyurethane rubber was used to actuate the FSR device. In general, FSR response approximately follows an inverse power-law characteristic (roughly 1/R)."

Please note that Appendix 1, Appendix 2, Appendix 3, and Appendix 4 have 12 pages, 4 pages, 26 pages, and 5 pages, respectively, and they are part of the teaching of the current application, attached to this filing.

Any variations of the above teaching are also intended to be covered by this patent application, including all combinations of each or all embodiments.

The invention claimed is:

1. A system for tracking of people in a room, said system comprising:
   a floor mat on a floor of said room;
   multiple pressure sensor housings, arranged in two-dimensional arrays in X and Y axes, parallel to plane of said floor, distributed over and covering said floor;
   wherein said multiple pressure sensor housings are embedded in said floor mat;
   wherein a first of said multiple weight sensor housings comprises two pressure sensors of two types, named first-type pressure sensor and second-type pressure sensor;
   wherein said second-type pressure sensor's measurement accuracy is more than that of said first-type pressure sensor;
   wherein said first-type pressure sensor is a switch and indicates existence of a person, based on a threshold on a weight value detected by said first-type pressure sensor;
   wherein when said first-type pressure sensor indicates existence of a person, then said second-type pressure sensor gets activated to take weight measurement of said person;
   a central computer or processor,
   wherein said central computer or processor receives said indication of existence of said person from said first-type pressure sensor;
   wherein said central computer or processor receives said weight of said person from said second-type pressure sensor,
   wherein said first-type pressure sensor comprises a first container;
   wherein said second-type pressure sensor comprises a second container;
   wherein said first container comprises first material;
   wherein said second container comprises second material;
   wherein said first material has a specific electrical resistivity value which is a function of pressure or weight exerted on said first material, expressed as a Z-number;
   wherein Z-number is a pair of (A,B), where A is Fuzzy value for said pressure or weight exerted, and B is the reliability for A;
   wherein said second material has a specific electrical resistivity value which is a function of pressure or weight exerted on said second material, expressed as a Z-number;
   wherein said second-type pressure sensor is calibrated using a calibration object which is placed on said first of said multiple weight sensor housings and three of its immediate neighboring housings among said multiple weight sensor housings.

2. A system for tracking of people in a room, said system comprising:
   a floor mat on a floor of said room;
   multiple pressure sensor housings, arranged in two-dimensional arrays in X and Y axes, parallel to plane of said floor, distributed over and covering said floor;
   wherein said multiple pressure sensor housings are embedded in said floor mat;
   wherein a first of said multiple weight sensor housings comprises two pressure sensors of two types, named first-type pressure sensor and second-type pressure sensor;
   wherein said second-type pressure sensor's measurement accuracy is more than that of said first-type pressure sensor;
   wherein said first-type pressure sensor is a switch and indicates existence of a person, based on a threshold on a weight value detected by said first-type pressure sensor;
   wherein when said first-type pressure sensor indicates existence of a person, then said second-type pressure sensor gets activated to take weight measurement of said person;
   a central computer or processor,
   wherein said central computer or processor receives said indication of existence of said person from said first-type pressure sensor;
   wherein said central computer or processor receives said weight of said person from said second-type pressure sensor,
   wherein said first-type pressure sensor comprises a first container;
   wherein said second-type pressure sensor comprises a second container;
   wherein said first container comprises first material;
   wherein said second container comprises second material;
   wherein said first material has piezoelectric effect, producing electric charges as a function of pressure or weight exerted on said first material, expressed as a Z-number;
   wherein Z-number is a pair of (A,B), where A is Fuzzy value for said pressure or weight exerted, and B is the reliability for A;
   wherein said second material has piezoelectric effect, producing electric charges as a function of pressure or weight exerted on said second material, expressed as a Z-number;
   wherein said second-type pressure sensor is calibrated using a calibration object which is placed on said first of said multiple weight sensor housings and three of its immediate neighboring housings among said multiple weight sensor housings.

3. The system for tracking of people in a room as recited in claim 1, said system comprises: a memory unit to record locations of said person.

4. The system for tracking of people in a room as recited in claim 2, said system comprises: a memory unit to record locations of said person.

5. The system for tracking of people in a room as recited in claim 1, said system comprises: a data transfer bus around circumference of said floor mat.

6. The system for tracking of people in a room as recited in claim 2, said system comprises: a data transfer bus around circumference of said floor mat.

7. The system for tracking of people in a room as recited in claim 1, said system comprises: a data transfer bus inside thickness of said floor mat.

8. The system for tracking of people in a room as recited in claim 2, said system comprises: a data transfer bus inside thickness of said floor mat.

9. The system for tracking of people in a room as recited in claim 1, said system comprises: a partial tray on top of said floor mat.

10. The system for tracking of people in a room as recited in claim 2, said system comprises: a partial tray on top of said floor mat.

11. The system for tracking of people in a room as recited in claim 1, wherein said floor mat comprises plastic or elastic substance.

12. The system for tracking of people in a room as recited in claim 2, wherein said floor mat comprises plastic or elastic substance.

13. The system for tracking of people in a room as recited in claim 1, wherein said first of said multiple weight sensor housings is a flexible housing or substance.

14. The system for tracking of people in a room as recited in claim 2, wherein said first of said multiple weight sensor housings is a flexible housing or substance.

15. The system for tracking of people in a room as recited in claim 1, wherein said first container is a flexible container or substance.

16. The system for tracking of people in a room as recited in claim 2, wherein said first container is a flexible container or substance.

17. The system for tracking of people in a room as recited in claim 1, wherein said first of said multiple weight sensor housings communicates with a second of said multiple weight sensor housings.

18. The system for tracking of people in a room as recited in claim 2, wherein said first of said multiple weight sensor housings communicates with a second of said multiple weight sensor housings.

19. The system for tracking of people in a room as recited in claim 1, wherein said first of said multiple weight sensor housings communicates with all its immediate neighboring housings of said multiple weight sensor housings.

20. The system for tracking of people in a room as recited in claim 2, wherein said first of said multiple weight sensor housings communicates with all its immediate neighboring housings of said multiple weight sensor housings.

* * * * *